United States Patent [19]

Matsushige

[11] Patent Number: 5,487,067
[45] Date of Patent: Jan. 23, 1996

[54] AUDIO DATA COMMUNICATIONS

[75] Inventor: Takashi Matsushige, Stanton Harcourt, England

[73] Assignee: Sony Corporation, Tokyo, Japan

[21] Appl. No.: 189,783

[22] Filed: Feb. 1, 1994

[30] Foreign Application Priority Data

Apr. 1, 1993 [GB] United Kingdom .................. 9306879

[51] Int. Cl.$^6$ .................................................. H04L 12/423
[52] U.S. Cl. ...................... 370/85.7; 370/85.12; 381/80; 381/119; 369/4
[58] Field of Search ............................ 370/80, 85.7, 85.9, 370/85.11, 85.12, 95.3; 381/80, 81, 119, 123; 360/27, 79; 369/4, 24, 33; 455/6.1

[56] References Cited

U.S. PATENT DOCUMENTS

| | | | |
|---|---|---|---|
| 4,769,839 | 9/1988 | Preineder et al. | 370/85.7 |
| 4,814,761 | 3/1989 | Takahashi et al. | 340/825.05 |
| 5,054,044 | 10/1991 | Audon et al. | 370/85.12 |
| 5,175,771 | 12/1992 | Zampini et al. | 381/81 |
| 5,212,733 | 5/1993 | DeVitt et al. | 381/119 |
| 5,276,682 | 1/1994 | Van As et al. | 370/85.7 |
| 5,349,583 | 9/1994 | Christensen et al. | 370/85.12 |

FOREIGN PATENT DOCUMENTS 2229298 9/1990 United Kingdom .

Primary Examiner—Benedict V. Safourek
Attorney, Agent, or Firm—William S. Frommer; Alvin Sinderbrand

[57] ABSTRACT

Data communications apparatus comprises a master device for processing digital audio data and a plurality of slave devices connectable in a ring network with the master device. Each slave device has a plurality of data channels associated therewith and is arranged for supply, in use, of audio data from the ring network to its associated data channels and/or to the ring network from its associated data channels. The master and slave devices are arranged for serial communication via the ring network in use of digital audio data formatted in frames, each frame comprising a plurality of data blocks which data blocks contain audio sample data corresponding to respective audio signals. The master and slave devices are further arranged for communication via the ring network in use of set-up data comprising set-up commands transmitted by the master device to the slave devices and set-up responses transmitted by the slave devices to the master device, whereby the master device determines the arrangement of slave devices around the ring network and the number of data channels associated with each slave device, and, in dependence upon the said arrangement and numbers of data channels, allocates to any slave device which is arranged for supply of audio data from the network to its associated data channels a sequence of data blocks within each frame of the digital audio data format in which sequence of data blocks audio data will be transmitted to that slave device for supply to its associated data channels.

26 Claims, 20 Drawing Sheets

| COMMAND NUMBER | COMMAND SYMBOL | NAME OF SYMBOL | FUNCTION |
|---|---|---|---|
| 0 | 11000 10001 | JK | SYNC |
| 1 | 11111 11111 | II | NOT USED |
| 2 | 01101 01101 | TT | NOT USED |
| 3 | 01101 11001 | TS | NOT USED |
| 4 | 11111 00100 | IH | SAL |
| 5 | 01101 00111 | TR | NOT USED |
| 6 | 11001 00111 | SR | NOT USED |
| 7 | 11001 11001 | SS | NOT USED |
| 8 | 00100 00100 | HH | HDLC 0 |
| 9 | 00100 11111 | HI | HDLC 1 |
| A | 00100 00000 | HQ | HDLC 2 |
| B | 00111 00111 | RR | HDLC 3 |
| C | 00111 11001 | RS | HDLC 4 |
| D | 00000 00100 | QH | HDLC 5 |
| E | 00000 11111 | QI | HDLC 6 |
| F | 00000 00000 | QQ | HDLC 7 |

*FIGURE 6*

AUDIO DATA COMMUNICATIONS

BACKGROUND OF THE INVENTION

1. Field of the Invention

This invention relates to audio data communications.

2. Description of the Prior Art

Various standards have been established for communication of digital audio data by audio equipment. Two-channel, or stereo, devices generally conform to the AES/EBU standard defined in AES3-1985 (J. Audio Eng. Soc., Vol 33, No 12, 1985, 975–984). This standard provides for the serial digital transmission of two channels of periodically sampled audio signals, two samples of audio data, one from each channel, being transmitted in each sample period. For communication between multi-channel devices, for example between a digital mixer and digital multi-track tape recorders, the Multi-Channel Audio Digital Interface standard (MADI) has been developed. This standard is defined in AES10-1991 (J. Audio Eng. Soc., Vol 39, No 5, 1991, 368–377). The MADI format is based on the AES/EBU two-channel format but provides for the serial digital transmission of 56 channels of periodically sampled audio signals. Briefly, digital audio data is formatted in frames, each of which consists of 56 data blocks or "channels". Each channel consists of a set of audio sample data relating to one signal accompanied by related data bits. The complete frame is transmitted in one period of the source sampling frequency, so samples of up to 56 audio signals can be transmitted in each sample period.

While MADI provides for communication of 56 channels of audio data, only point-to-point interconnections between transmitter and receiver are supported. Thus, for communication between a digital mixer and a number of multi-channel devices, such as multi-track tape recorders, analogue-to-digital converters (ADCs), and digital-to-analogue converters (DACs) for example, separate MADI links have to be provided between each device and the mixer.

Existing multi-channel devices tend to have substantially less than 56 channels. For example, a typical ADC/DAC rack might handle 16 data channels, and multi-track tape recorders typically handle 24, 32 of 48 data channels. Since MADI supports only point-to-point interconnections, the full capacity of the MADI carrier cannot always be utilised. If a device has only 24 data channels, for example, then 32-channel capability on the point-to-point MADI link is lost.

MADI is used for digital audio signal communication only. Synchronisation between devices is achieved by means of an independently distributed master synchronising signal. A further communication link must be provided for control communication between devices. Thus, the full interconnection between a device and a digital mixer is as shown in FIG. 1 of the accompanying drawings. A pair of links 1a, 1b is required for two-way digital audio signal communication in accordance with the MADI standard. Another connection 2 is required for synchronisation between the mixer and device. Control communication between the mixer and device, ie of machine control commands, device status responses, time codes etc, is achieved by means of an independent remote control link 3 using a known remote control protocol. Thus, interconnection of the device and mixer for MADI communication requires at least four connections between the device and mixer. As a further four connections are required for each additional device connected to the mixer, the overall system connection can be extremely complex. Further, while MADI links using optical fibre cables can be several kilometers in length, known remote control protocols generally specify cable lengths significantly less than this, for example 100 meters. Thus, MADI cable lengths are limited in practice by the need for an independent control link.

SUMMARY OF THE INVENTION

According to one aspect of the present invention there is provided data communications apparatus comprising:

a master device for processing digital audio data; and a plurality of slave devices connectable in a first ring network with the master device, each slave device having a plurality of data channels associated therewith and being arranged for supply, in use, of audio data from the ring network to its associated data channels and/or to the ring network from its associated data channels; wherein the master and slave devices are arranged for serial communication via the ring network in use of digital audio data formatted in frames, each frame comprising a plurality of data blocks which data blocks contain audio sample data corresponding to respective audio signals;

and wherein the master and slave devices are further arranged for communication via the ring network in use of set-up data comprising set-up commands transmitted by the master device to the slave devices and set-up responses transmitted by the slave devices to the master device, whereby the master device determines the arrangement of slave devices around the ring network and the number of data channels associated with each slave device, and, in dependence upon the said arrangement and numbers of data channels, allocates to any slave device which is arranged for supply of audio data from the network to its associated data channels a sequence of data blocks within each frame of the digital audio data format in which sequence of data blocks audio data will be transmitted to that slave device for supply to its associated data channels.

Thus, the invention allows a master device such as a digital mixer to communicate with a plurality of slave devices connected in a ring network with the master using a serial multi-channel digital audio data format, and preferably the MADI format. Even though each slave device may have less data channels than the total number of data blocks within each frame of the audio data format, the provision for communication of set-up data via the ring network allows the master to allocate to slave devices at the outset particular sequences of data blocks within the digital audio frames according to the requirements of the slave devices and the arrangement of slave devices around the network. Data blocks within each frame of the format which will not be required for transmission of audio data from the master to a particular slave device for supply to its associated data channels can be assigned by the master to another device. (It is only necessary for the master to assign sequences of data blocks to slave devices which are arranged to supply audio data from the ring network to their associated data channels. Audio data supplied by a slave device to the network can be inserted in unoccupied data blocks, for example data blocks "freed" after extraction of audio data by that slave device or a preceding slave device as discussed further below.) In the preferred case where the digital audio data is formatted in MADI format, there are, as previously described, 56 data blocks (or "channels" in MADI terminology) within each frame of the format. Thus, although each slave device will typically have many less data channels than 56, particular sequences of channels within each frame can be allocated to particular slave devices as required for a given network. The data transfer capability provided by the multi-channel digital audio format can therefore be exploited more efficiently in the ring network than in the situation where the format is used for point-to-point communication between the master and each slave device independently. Further, the system interconnection for the ring network is substantially simplified as compared with a system involving separate point-to-point connections between the master and each slave device.

The slave devices may be, for example, multi-track tape recorders, ADCs, DACs and multi-channel gateways for peripheral devices which conform to different digital audio communications formats to the ring network, eg two-channel AES/EBU devices. It will be appreciated that where the slave device is a multi-track tape recorder, the said data channels associated with the slave are the recording/reproducing channels of the tape recorder. In the case of a gateway device such as an ADC/DAC or AES/EBU interface rack for example, the said data channels associated with the slave device provide for input and/or output of audio data between the slave device and peripheral devices connectable thereto.

The set-up data is communicated prior to commencement of digital audio communications on the network. Digital audio communication can then commence. Any slave device to which a sequence of data blocks has been allocated extracts the data from its allocated data blocks in frames received from the network for supply to its data channels. Audio data can thus be transmitted by the master to that slave device without having to transmit address data (as is the case in conventional computer ring networks) for which there is no provision in the MADI format.

Since the set-up data is transmitted prior to commencement of audio data communication, the same communication links can clearly be used for both the digital audio data and the set-up data. Accordingly, it is preferred that the ring network is formed by connecting each of the master and slave devices to the next of the said devices by means of a serial data communication link, and that each of the said devices is arranged for communication of both the digital audio data and the set-up data via the said communication links in use.

It is further preferred that the master and slave devices are arranged for transmission of data over the communication links in use at a transmission rate which is greater than the maximum used digital audio data transmission rate. (A "maximum used data transmission rate" is the maximum number of bits of a given type of data actually transmitted per second. Since transmission of that data may not be continuous, the maximum used data transmission rate may be less than the actual data transmission rate.) For example, MADI specifies a sample frequency within the range 32 to 48 KHz±12.5%. Each frame consists of 56 channels and each channel consists of 32 bits. As will be explained in more detail below, MADI specifies a 4–5 bit encoding scheme whereby each 4-bit byte of the channel data is encoded to 5 bits for transmission. Thus, for a maximum sample frequency of 48 KHz +12.5%=54 KHz, the maximum used digital audio data transmission rate for the MADI format is: $(54 \times 10^3) \times 56 \times 32 \times 5/4 = 120.96$ megabits per second (Mbps). If the ring network supports data transmission at a higher rate than this, then the additional data transfer capability can be used for remote control communication via the same links. As there is then no need for independent control communication links in the network, system interconnection is substantially simplified.

Accordingly, it is preferred in this case that each of the master and slave devices is arranged for communication via the said communication links of control data, comprising control commands transmitted by the master devices to the slave devices and control responses transmitted by the slave devices to the master device, whereby the master device can control operation of each slave device during communication of digital audio data on the ring network. For slave devices which are gateway devices connectable to one or more peripheral devices, each such slave device is arranged for controlling operation of its peripheral device or devices in use in response to said control data transmitted by the master device.

Where a slave device comprises a tape recording device, or is connectable to a peripheral tape recording device, the said control data may include time codes from the tape recording device transmitted by that slave device to the master device. However, the master device must be able to account for the transmission delay between supply of the time code by the tape recording device and receipt of the time code by the master. To this end, the master device may include a master counter, and the slave device may include: a slave counter synchronisable with the master counter in use; means for setting the count of the slave counter to that of the master counter; and means for sampling the count of the slave counter on receipt of the time code from the tape recording device, the slave device being arranged to transmit both the time code and the sampled count of the slave counter to the master device as control data in use. The master device can then determine from this control data, and the count of the master counter on receipt of the control data, the correct value for the time code at the time the master receives the time code as will be explained in detail below.

It will of course be appreciated that the master and slave devices, while incorporating features as described above, could be arranged for communication of the control data in use via separate control communication links, particularly if the data transmission capability of the network is not greater than the maximum used digital audio data transmission rate. As indicated above, however, it is preferable for control communication to be achieved via the same communication links as set-up and audio data communication.

The said set-up data, and, where provided, the said control data, is preferably communicated using the known HDLC (High-Level Data Link Control) protocol specified by the International Organisation for Standardisation. It is further preferred that each of the master and slave devices is arranged to encode the digital audio data to be transmitted by that device in use in accordance with a 4–5 bit encoding scheme whereby successive 4-bit bytes of the digital audio data are encoded into 5-bit data symbols each of which corresponds to a respective 4-bit data pattern, and that each of the said devices is further arranged to encode the HDLC data to be transmitted by that device in use such that successive n-bit bytes of the HDLC data are encoded using 5-bit symbols other than said data symbols. In particular, successive 3-bit bytes of the HDLC data may be encoded into pairs of 5-bit symbols other than said data symbols, each pair of 5-bit symbols corresponding to a respective 3-bit data pattern. For example, the encoding scheme employed may be based on the ANSI X3T9.5 (FDDI) committees 4-bit/5-bit code which is defined in ANSI X3T9.5/88-148 with the command symbols defined by this scheme being utilised here to encode the HDLC data. This will be explained in mope detail below.

In embodiments of the invention, the apparatus may include a control console for controlling operation of the master device in the first ring network in use; and a work station for storage and reproduction of automation data defining a processing operation performed by the master device in the first ring network in use; the master device, console and work station being connectable in a further, process control ring network and arranged for serial communication via the process control ring network in use of process control data comprising process control commands transmitted by the console to the master device for controlling operation of the master device in the first ring network, process control responses transmitted by the master device to the console indicating the status of slave devices in the first ring network, and said automation data reproduced by the work station and transmitted by the work station to the master device and console, the reproduced automation data comprising said process control commands and responses transmitted by the console and master device during a previous processing operation performed by the master device in the first ring network. In this case, the master device, console and work station are further arranged for communication of said process control data formatted in frames corresponding to the frames of the said digital audio data format, the process control commands, process control responses and reproduced automation data occupying respective sequences of data blocks within said frames. This will be explained in detail below.

The invention encompasses a slave device, and, independently, a master device, of data communications apparatus as hereinbefore described. Where the digital audio data is formatted in MADI format, the master device is advantageously arranged to adapt its operation for point-to-point MADI communication with a slave device if no set-up response is received by the master device in response to a set-up command transmitted by the master device in use. The master device is thereby compatible with existing MADI devices and so can also be used for conventional MADI communication. Control communication must then be by way of a separate control link as described with reference to FIG. 1.

The invention also provides a method for communication of digital audio data between a master device, for processing digital audio data, and a plurality of slave devices connected in a first ring network with the master device, each slave device having a plurality of data channels associated therewith and being arranged for supply of audio data from the ring network to its associated data channels and/or to the ring network from its associated data channels, which method comprises:

transmitting the digital audio data serially between the master and slave devices, the digital audio data being formatted in frames each frame comprising a plurality of data blocks which data blocks contain audio sample data corresponding to respective audio signals; and transmitting between the master and slave devices via the ring network set-up data comprising set-up commands transmitted by the master device to the slave devices and set-up responses transmitted by the slave devices to the master device, whereby the master device determines the arrangement of slave devices around the ring network and the number of data channels associated with each slave device, and, in dependence upon the said arrangement and numbers of data channels, allocates to any slave device which is arranged for supply of audio data from the network to its associated data channels a sequence of data blocks within each frame of the digital audio data format in which sequence of data blocks audio data will be transmitted to that slave device for supply to its associated data channels.

It will be appreciated that the invention encompasses a method for communication of digital audio data between a master device, for processing digital audio data, and a plurality of slave devices connected in a ring network with the master device, which method is carried out using apparatus as hereinbefore described. Further it is to be appreciated that, in general, where features are described herein with reference to an apparatus according to the invention, corresponding features may be provided in accordance with a method of the invention and vice versa.

BRIEF DESCRIPTION OF THE DRAWINGS

The above, and other objects, features and advantages of this invention will be apparent from the following detailed description of illustrative embodiments which is to be read in connection with the accompanying drawings, in which:

FIG. 5a is a timing diagram used in explaining the operation of the embodiment of FIG. 3 using the method of FIG. 4a;

FIG. 6 is a table showing the function of command symbols in embodiments of the invention;

DESCRIPTION OF THE PREFERRED EMBODIMENTS

Figure 1:
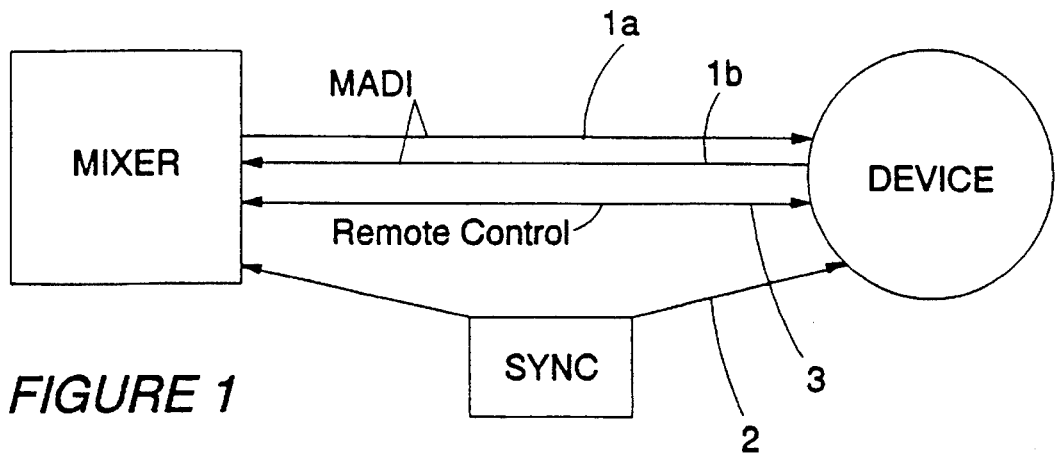
FIG. 1 illustrates schematically a digital mixer and device connected in known manner for digital audio signal communication in accordance with the MADI standard.
Figure 2:
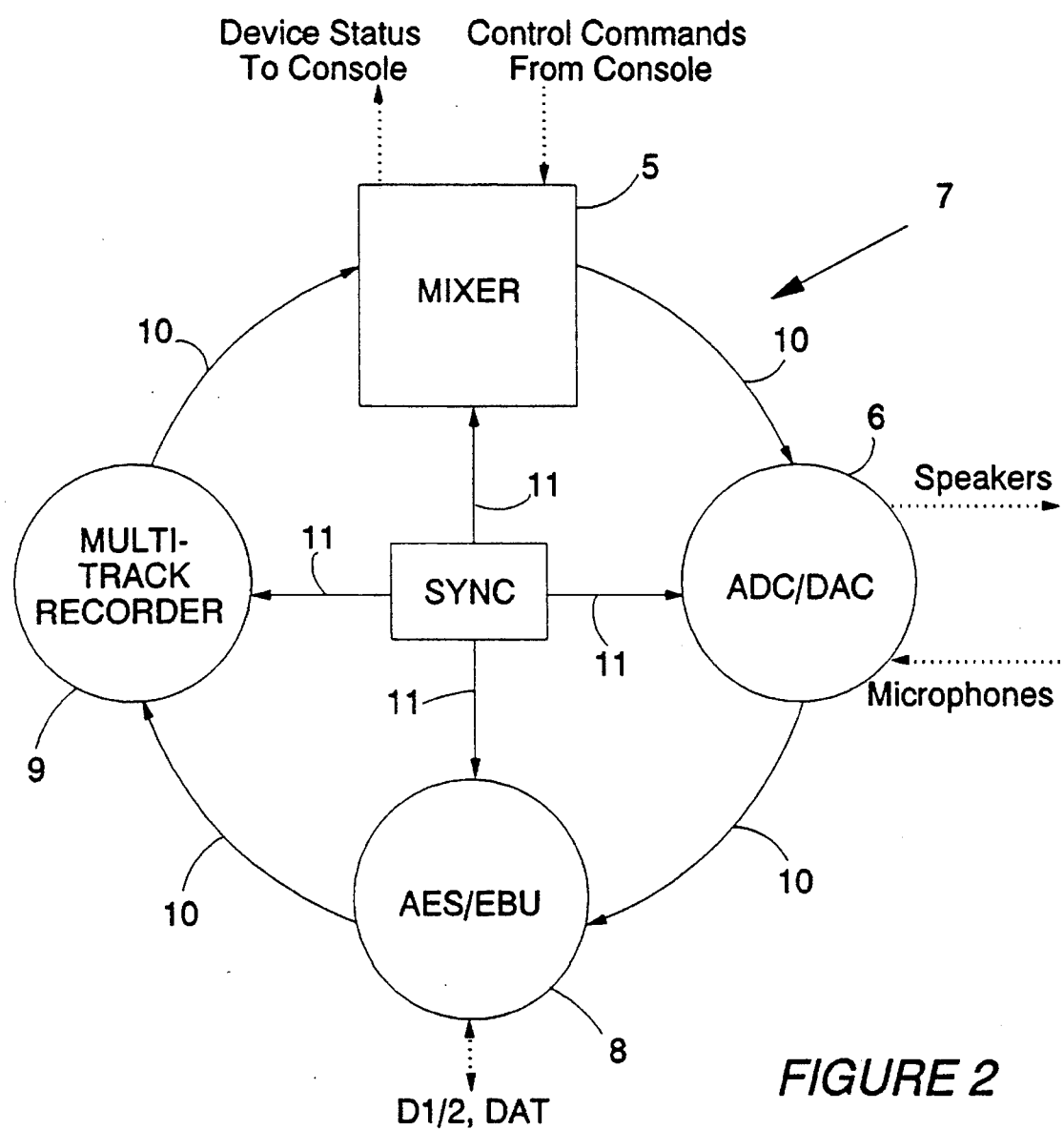
FIG. 2 is a schematic illustration of the system architecture of one example of data communications apparatus embodying the invention.

FIG. 2 shows the system architecture of one example of data communications apparatus embodying the invention. A master device, in the form of a digital mixer 5, is connected in a ring network, generally indicated at 7, with three slave devices. The first slave device in the ring network is a multi-channel ADC/DAC rack 6 for connection to analogue peripheral devices such as speakers and microphones to provide for communication of audio data between these devices and the ring network. The second slave device in the ring network 7 is an AES/EBU rack 8 for connection to two-channel digital equipment, such as D1 and D2 format DVTRs, digital audio tape recorders (DATs) etc, which operate in accordance with the AES/EBU standard to allow communication of audio data between the ring network 7 and these peripheral devices. The number of peripheral devices which can be connected to each rack 6, 8 depends upon the number of data channels provided by the rack. Thus, the ADC/DAC rack 6 and the AES/EBU rack 8 are kinds of gateways which provide for communication with analogue and two-channel digital equipment respectively. The third slave device in the ring network 7 is a digital audio multi-track tape recorder 9.

Each of the devices 5, 6, 8, 9 is connected to the adjacent device in the ring network 7 by a single serial data communication link 10 which is preferably an optical fibre cable. A master synchronisation signal (SYNC) is distributed to each device independently of the links 10 by means of SYNC connections 11.

The structure and operation of the link connection circuitry which forms the interface with the incoming and outgoing links 10 in each device will be described in detail with reference to FIGS. 9 to 12. Briefly, however, each device is arranged for transmission and reception of audio data in accordance with the MADI standard. Thus, audio data is formatted in frames each consisting of 56 data blocks, or "channels" in MADI terminology. Each channel consists of a digital audio sample, and related bits, corresponding to a respective audio signal. The data is encoded prior to transmission and the encoding scheme employed is based on the ANSI X3T9.5(FDDI) committees 4-bit/5-bit code referred to earlier. According to this scheme, data, here the unencoded MADI frames, is treated as successive 8-bit bytes, each 8-bit byte being divided into two 4-bit nibbles. Each 4-bit nibble is encoded into a 5-bit data symbol according to a 4–5 bit NRZ (non-return to zero) encoding scheme, and the NRZ code bits are then transmitted using an NRZI (non-return to zero, invert on ones) polarity-free encoding.

The 4–5 bit NRZ encoding scheme is such that, of the 32 bit patterns possible for a 5-bit symbol, 16 are chosen as data symbols to represent the 16 possible 4-bit input data patterns. Of the remainder, some are reserved for use as "command symbols" the use of the which in the embodiments described herein will be explained below. The data symbols and command symbols can be identified and decoded separately by receivers in the link connection circuitry in each device. As far as audio data is concerned, however, the transmission format is in accordance with the MADI standard.

As previously explained, the maximum used digital audio data transmission rate for MADI communication is 120.96 Mbps. In accordance with the FDDI ANSI X3T9.5 system, however, the ring network in the embodiments to be described operates at a transmission rate for all data of $100 \times 5/4 = 125$ Mbps. The additional data transfer capability over and above that required for MADI digital audio data communication allows the command symbols referred to above to be transmitted during audio data transmission. In the embodiments to be described, some of these command symbols are used for encoding set-up data and control data. The details of this will be discussed further below, but the purpose of the set-up data and control data will now be briefly described with reference to the example of FIG. 2.

As previously described, each frame of the MADI format consists of 56 "channels", each channel representing a digital audio sample of a corresponding audio signal. As MADI frames are transmitted around the ring network of FIG. 2, each slave device 6, 8, 9 must be able to identify audio data within the MADI frames intended for that slave device (for example audio data to be output to a peripheral device of the slave) and, where appropriate, to "insert" in MADI frames audio data to be communicated to the mixer 5 (eg audio data supplied from a peripheral device of the slave). To establish a suitable data flow system for the network when the devices 6, 8, 9 are connected in the ring network 7 with the mixer 5, the mixer 5 must first determine the number of data channels associated with each device, and the arrangement of devices in the network, and then determine how the 56 channels in each frame of the MADI format are to be utilised for supply of audio data to the devices as MADI frames are transmitted around the ring. Thus, after connection of a system as shown in FIG. 2, set-up data is communicated between the mixer 5 and devices 6, 8, 9 whereby the mixer "asks" each device, by transmitting a set-up command to the device, to indicate its channel capacity, the devices respond to the mixer by transmitting set-up responses, and the mixer determines from the responses the appropriate channel allocation system for the devices. Each device which is arranged to supply audio data from the network to its associated data channels is then informed by the mixer, by means of a further set-up command, which sequence of channels within the MADI frames will be used by the mixer to transmit audio data to that device. Thereafter, each such device monitors its allocated channels in MADI frames received from the network, extracting data therefrom for supply to its associated data channels, for example for output to its peripheral devices. When supplying audio data to the network, eg from its peripheral devices, a slave device may either utilise those channels "freed" after the device has extracted data from the frame for supply to its peripheral devices, or may utilise the spare frame capacity after "packing" the remaining data in the frame as is described further below with reference to FIGS. 3 to 5.

After the data flow system for the network has been established through the communication of set-up data between the mixer 5 and devices 6, 8 and 9, audio data communications can commence. As indicated above, however, the data transfer capability of the network allows for control communication during audio data transmission via the same links 10. Thus, the mixer 5 can control operation of each of the devices 6, 8, 9 by means of control data transmitted in addition to the digital audio data via the same links 10. For example, the mixer can control the gain of the ADC/DAC rack 6, and also transmit commands such as PLAY, STOP, RECORD, FAST FORWARD etc to the recorder 9 and two-channel peripheral devices via the AES/EBU rack 8. Equally, the status of the devices 6, 9 and peripheral devices connected to the AES/EBU rack 8 can be transmitted as control data to the mixer. The status may indicate current settings, responses to control commands, and time code information from tape recorders. As indicated in FIG. 2, control commands can be entered by an operator via a control console (not shown) connected to the digital mixer 5. Equally, device status information received by the mixer 5 can be supplied to the console for display to the operator.

Figure 3:
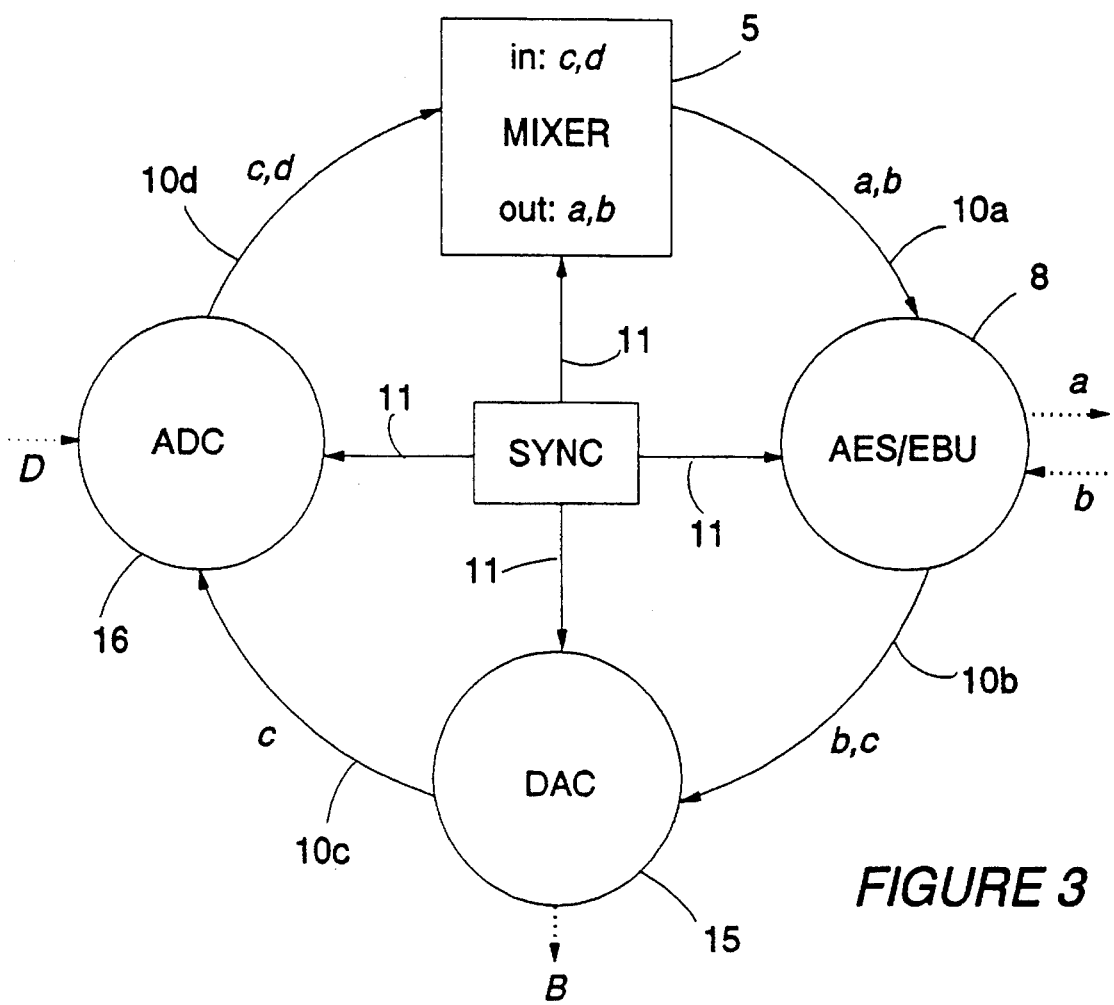
FIG. 3 illustrates schematically a further example of data communications apparatus embodying the invention indicating the flow of audio data in the system.

The flow of audio data around the ring network will now be described with reference to FIG. 3. FIG. 3 shows another example of apparatus embodying the invention in which the slave devices in the ring network are an AES/EBU rack 8, a DAC rack 15, and a separate ADC rack 16, the master device being a digital mixer 5 as before. The communication links between adjacent devices in the ring network are labelled as 10a, 10b, 10c and 10d respectively. SYNC connections 11 are provided to each device in the network as in FIG. 2. After communication of set-up data as described with reference to FIG. 2, audio data communication can commence. The flow of audio data around the ring network can be .understood by considering the following example in which analogue signals are represented by capital letters and digital signals by small letters.

Suppose that an analogue signal D is being supplied to the ADC rack 16 from its peripheral devices as shown in FIG. 3. These peripheral devices may be a bank of microphones for example, and so although the analogue input to the ADC is indicated as a single analogue signal D, D in fact represents a plurality of analogue signals, one from each microphone, which are supplied to the data channels of the ADC rack. Suppose also that the analogue signal D is to be mixed with an audio signal recorded on a DAT connected to the AES/EBU rack 8. In response to a control command entered at the operator console (not shown) and communicated to the AES/EBU rack 8 by the mixer 5, the recorded audio signal is reproduced by the peripheral DAT. This signal is supplied to the AES/EBU rack 8 as the digital signal c shown in the figure where, again, the signal c represents samples of more than one audio signal. Suppose further that the signals D and c are to be mixed by the digital mixer 5 to produce two signals a and b, where signal a is to be recorded on a further DAT connected to the AES/EBU rack 8 and signal b is to be supplied to one or more analogue peripheral devices connected to the DAC rack 15. The two signals a, b both represent mixes of the signals c and D, although c and D may be mixed in different proportions in each case.

The analogue signal D is digitised by the ADC 16 for onward transmission around the ring network, and the signal c reproduced by the DAT is supplied by the AES/EBU rack 8 to the ring network for onward transmission to the mixer 5. Considering first the signal on the link 10d between the ADC rack 16 and the mixer 5, a 56 channel MADI frame containing a sequence of channels occupied by the signal c, and a further sequence of channels occupied by the signal d (where it is to be understood that all occupied channels in the MADI frame here represent audio samples corresponding to the same sample period) is transmitted on the link 10d. The MADI frame containing the signals c and d is supplied to the input side of the digital mixer 5 where the signals c and d are processed to produce the signals a, b. The mixer 5 then transmits to the AES/EBU rack 8 via the link 10a a MADI frame containing the signals a, b, where the signal a occupies the channels allocated to the AES/EBU rack 8 at set-up. The AES/EBU rack 8 extracts the signal a from its allocated channels in the received MADI frame. The signal a is later output by the AES/EBU rack 8 to its peripheral DAT for recording.

Removal of the signal a from the MADI frame "frees" a sequence of channels corresponding to the number of channels previously occupied by the signal a. This allows the AES/EBU rack 8 to "insert" a further portion of the signal c representing audio samples corresponding to the next sample period. Thus, the AES/EBU rack 8 transmits onward to the DAC rack 15 via the link 10b a MADI frame occupied by the signals b and c, where b occupies the sequence of channels allocated to the DAC rack 15 at set-up. The DAC rack 15 then extracts the signal b from the received MADI frame and converts this to the equivalent analogue signal B for output to its analogue peripheral devices. Since no signal is to be input to the ring network by the DAC 15, the DAC transmits onward via the link 10c a MADI frame containing only the signal c and thus having a sequence of unoccupied channels. On receipt of this MADI frame, the ADC rack 16 then "inserts" in the unoccupied channels the next portion of the signal d representing audio samples corresponding to the same sample period as the samples of the signal c occupying the same frame. The ADC rack 16 thus outputs a MADI frame occupied by the signals c and d. This frame is transmitted via the link 10d to the mixer 5, and the above process is repeated for the new MADI frame received by the mixer 5.

Flow of audio data round the network continues as described above, the mixer 5 mixing successive portions of the signals c, d corresponding to successive sample periods and carried by successive MADI frames on the link 10d, and transmitting over the link 10a MADI frames containing successive portions of the signals a, b for output to peripheral devices via the racks 8 and 15.

The above example illustrates the general principles of flow of audio data around ring networks embodying the invention. However, the ordering of data corresponding to different signals in MADI frames as data flows around the ring network can be handled in one of two ways as will now be described. The first method involves "packing" the data in each device in the ring network. This method is illustrated in FIG. 4a which shows schematically MADI frames transmitted on the respective links 10a, 10b, 10c and, 10d for the system of FIG. 3.

Figure 4A:
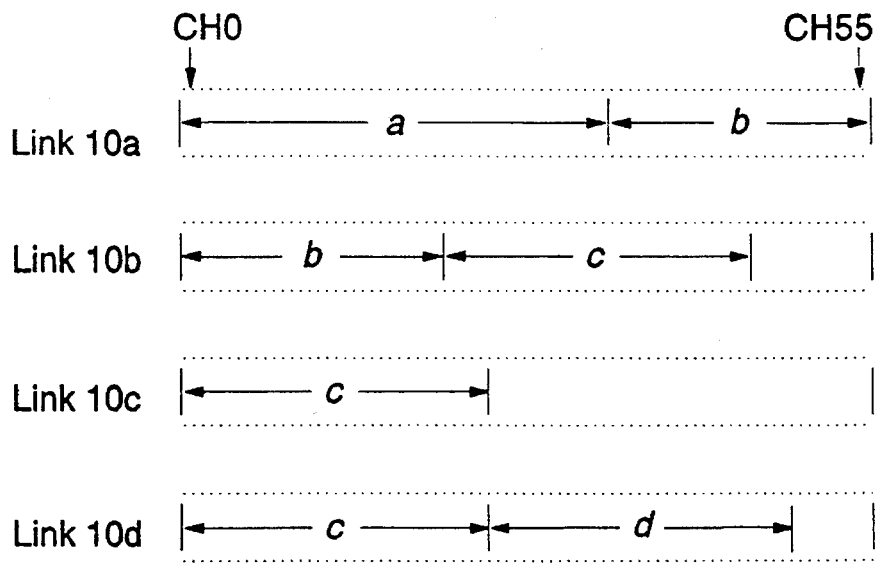
FIG. 4a is used in explaining one method of audio data transmission in relation to the embodiment of FIG. 3.

In FIG. 4a, each MADI frame is shown with channel 0 (CH0), which is transmitted first, on the left hand side of the frame, and channel 55 (CH55) on the right hand side of the frame. The sequences of channels occupied by the signals a, b, c and d are indicated schematically in the MADI frames. Thus, the mixer 5 transmits along the link 10a a MADI frame in which an initial sequence of channels is occupied by the signal a, immediately followed by a sequence of channels occupied by the signal b. When this frame is received by the AES/EBU rack 8, the AES/EBU rack stores the complete frame in an internal memory, and then extracts the signal a (which occupies the channels allocated to the AES/EBU rack 8) for output to its peripherals. The AES/EBU rack 8 then deletes the signal a from the stored MADI frame, "moves up" the signal b to the position of the first unoccupied channel (ie channel 0) available after deletion of signal a, and then adds the signal c in the sequence of channels immediately following the signal b. Clearly, it is a requirement here that $N_c \leq 56-N_b$, where $N_x$ signifies the number of channels occupied by a signal x, but this will have been established by the mixer 5 at set-up prior to allocation of channels among the slave devices. The resulting MADI frame shown in FIG. 4a is then output along the link 10b to the DAC 15.

The DAC 15 again stores the received MADI frame in an internal memory, extracts the signal b (which occupies the channels allocated to the DAC 15), and converts this to the analogue signal B for output to its peripherals. Signal b is then deleted from the stored MADI frame, and c "moved up" to the channel 0 position leaving a sequence of unoccupied channels after the signal c. The resulting MADI frame, as shown in FIG. 4a, is then output along the link 10c to the ADC 16.

The ADC 16 again stores the whole of the received MADI frame in an internal memory. The ADC 16 then converts the analogue signal D received from its peripherals to the digital signal d, and inserts the signal d in the sequence of channels immediately following the signal c in the stored MADI frame, where $N_d \leq 56-N_c$. This frame is then output along the link 10d as shown in FIG. 4a and received by the mixer 5.

This method of "packing" the digital signals in each MADI frame such that signals occupy the lowest available channel position in the frame, involves each device storing a complete frame to memory on receipt to allow packing of the data using this memory. A delay of at least one sample period is therefore introduced by each device in the ring network. This is clearly illustrated by the timing diagram of FIG. 5a which shows schematically the timing of transmission of MADI frames along the links 10a to 10d in the embodiment of FIG. 3 using the data packing method described above. The timing of frames is shown relative to the SYNC signal supplied to each device in the ring network via the SYNC connections 11. In the example illustrated, the SYNC signal has a period of 20 microseconds corresponding to a sample frequency of 50 KHz. The timing of data output by devices relative to the SYNC signal is also shown.

Figure 5A:
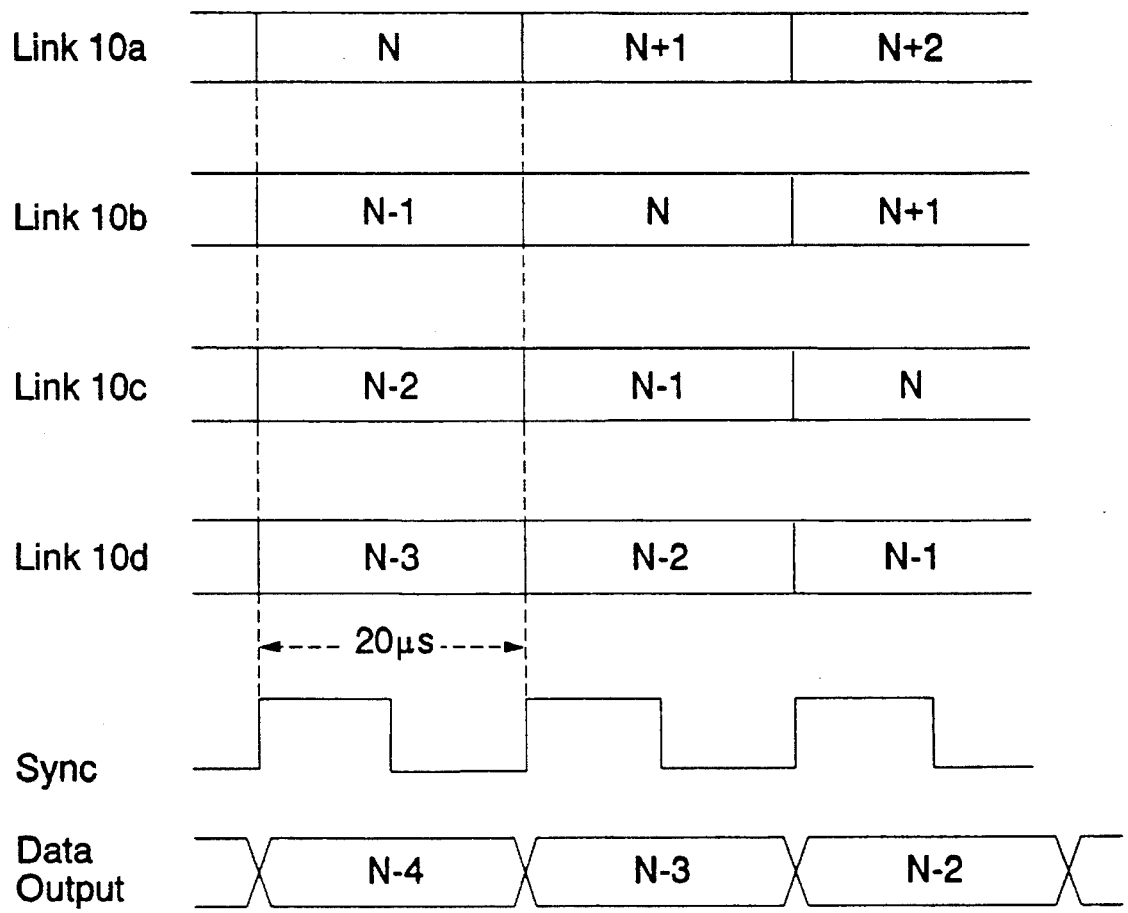

The top line in FIG. 5a shows schematically successive MADI frames N, N+1, N+2 etc transmitted along the link 10a by the mixer 5. The start of transmission of each of these frames is triggered by the positive edge of the SYNC signal as illustrated in the figure. Since the data packing method requires a complete MADI frame to be received from the incoming link to a device before the corresponding frame can be transmitted along the outgoing link, the frame N transmitted by the mixer 5 along the link 10a to the AES/EBU rack 8 cannot be transmitted on along the link 10b until the next positive edge of the SYNC signal. Similarly, this frame received by the DAC 15 from the link 10b cannot be transmitted on round the link 10c until the following positive edge of the SYNC signal. At any time, therefore, if frame N is being transmitted along the link 10a, the links 10b, 10c and 10d carry the frames N–1, N–2 and N–3 respectively. (It will of course be appreciated that while corresponding frames on the links 10a to 10d are labelled as N–2, or N–1, or N etc for the sake of simplicity, the frames are not in fact identical since samples of the signals a, b, c and d are added or removed as the frames are transmitted around the ring.

The bottom line in FIG. 5a shows the timing of the output of data received from the network by the link connection circuitry in each of the master and slave devices 5, 8, 15, 16 in the ring network. (In the case of gateway devices such as the AES/EBU rack 8 and DAC rack 15 in FIG. 3, this data output is the data output to peripheral devices. In the case of the mixer 5, this data output is the data supplied to the mixing processor within the mixer. In the case of slave devices such as multi-track tape recorders, the data output is the data supplied to the recording channels of the device.) Data received by each device 5, 8, 15, 16 in FIG. 3 as a given MADI frame circulates round the ring network should be output simultaneously by the devices. Data output is triggered by the positive edge of the SYNC signal. From FIG. 5a, it is clear that a frame N originally transmitted along the link 10a by the mixer 5 is transmitted back to the mixer along the link 10d after three periods of the source sampling frequency (equivalent to periods of the SYNC signal) following the start of transmission of the frame N along the link 10a. The frame N has thus been fully received by the mixer 5, and hence can be output to the mixing processor, on the fourth positive edge of the SYNC signal following commencement of transmission of the frame N along the link 10a. Thus, as shown in the figure, as frame N is transmitted along the link 10a, data corresponding to frame N–4 is output by each device in the network which extracted data from frame N–4. In a network of four devices, including the mixer, there is therefore a four frame delay between transmission of data by the mixer and output of that data by slave devices. Clearly, if the number of devices in the network is increased, this delay will increase accordingly.

In view of the above, a data transmission method which does not involve packing the data is preferred, and such a method will now be described with reference to FIG. 4b.

Figure 4B:
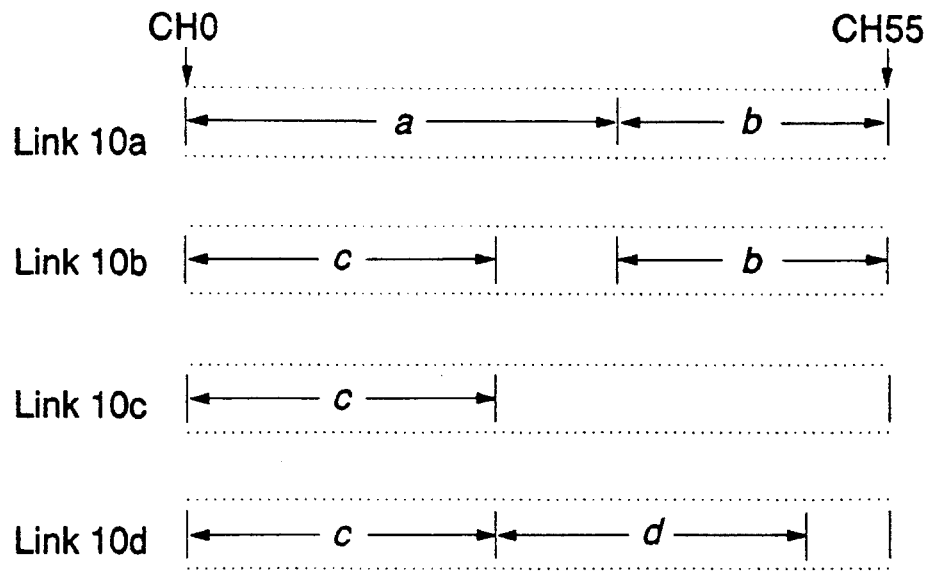
FIG. 4b is used in explaining a preferred method of audio data transmission in relation to the embodiment of FIG. 3.

FIG. 4b corresponds generally to FIG. 4a in that MADI frames for each of the links 10a, 10b, 10c and 10d are shown schematically for the system of FIG. 3, but FIG. 4b shows the different positions of the sequences of channels occupied by the signals a, b, c and d in the frames using the preferred transmission method. With this method, there is no need for each device to store a complete frame of data transmitted by the preceding device in the ring network. The operation is as follows.

The AES/EBU rack 8 receives the MADI frame containing the signals a and b from the mixer 5 via the link 10a as shown in FIG. 4b. As the frame is received, signal a (which occupies the channels allocated to the AES/EBU rack 8 on set-up) is extracted for output to the peripheral DAT. Shortly after the AES/EBU rack has started to receive the MADI frame transmitted by the mixer 5, transmission of a corresponding MADI frame along the link 10b is commenced with signal c received from the peripherals occupying a channel sequence starting with the lowest available vacant channel, ie channel 0. Thus, transmission along the link 10b commences well before transmission along the link 10a has ceased, with signal c effectively being inserted in the "slot" from which signal a is being removed. After transmission of signal c along the link 10b, there will be a sequence of unoccupied channels in the frame (as $N_c < N_a$) following which signal b, reception of which from the link 10a has already commenced, is transmitted onward on the link 10b in the same sequence of channels (ie those allocated to the DAC 15 at set-up) as this signal occupied in the frame received from the link 10a. It will be seen that, here, the DAC 15 has been allocated a different sequence of channels at set-up than in the method of FIG. 4a. The frame transmitted along the link 10b is thus as shown in FIG. 4b.

Since transmission along the link 10b commences well before reception from the link 10a is completed, the delay introduced by the AES/EBU rack 8 is considerably less than one frame period, and the memory capacity required in the AES/EBU rack is reduced accordingly. A typical value for the delay introduced by a rack using this method is one microsecond.

This process continues around the ring network, so that one microsecond after the MADI frame containing the signals c, b is transmitted along the link 10b to the DAC 15, the DAC 15 starts transmitting along the link 10c a MADI frame starting with the signal c. The remainder of the frame transmitted along the link 10c is unoccupied as shown in FIG. 4b since the signal b received from the link 10b is converted to the analogue signal B for output to the DAC's peripheral devices. Similarly, one microsecond after transmission of the MADI frame to the ADC 16 along the link 10c commences, the ADC 16 begins to transmit along the link 10d a MADI frame beginning with the signal c. The analogue input signal D to the ADC 16 is converted to the digital signal d and inserted in the MADI frame transmitted along the link 10d starting at the lowest available vacant channel ie immediately after the signal c. The mixer 5 thus receives the signal c, d and the process is repeated, the transmission delay and hence the memory capacity required in each device being substantially reduced as compared with the data packing method of FIG. 4a.

Figure 5B:
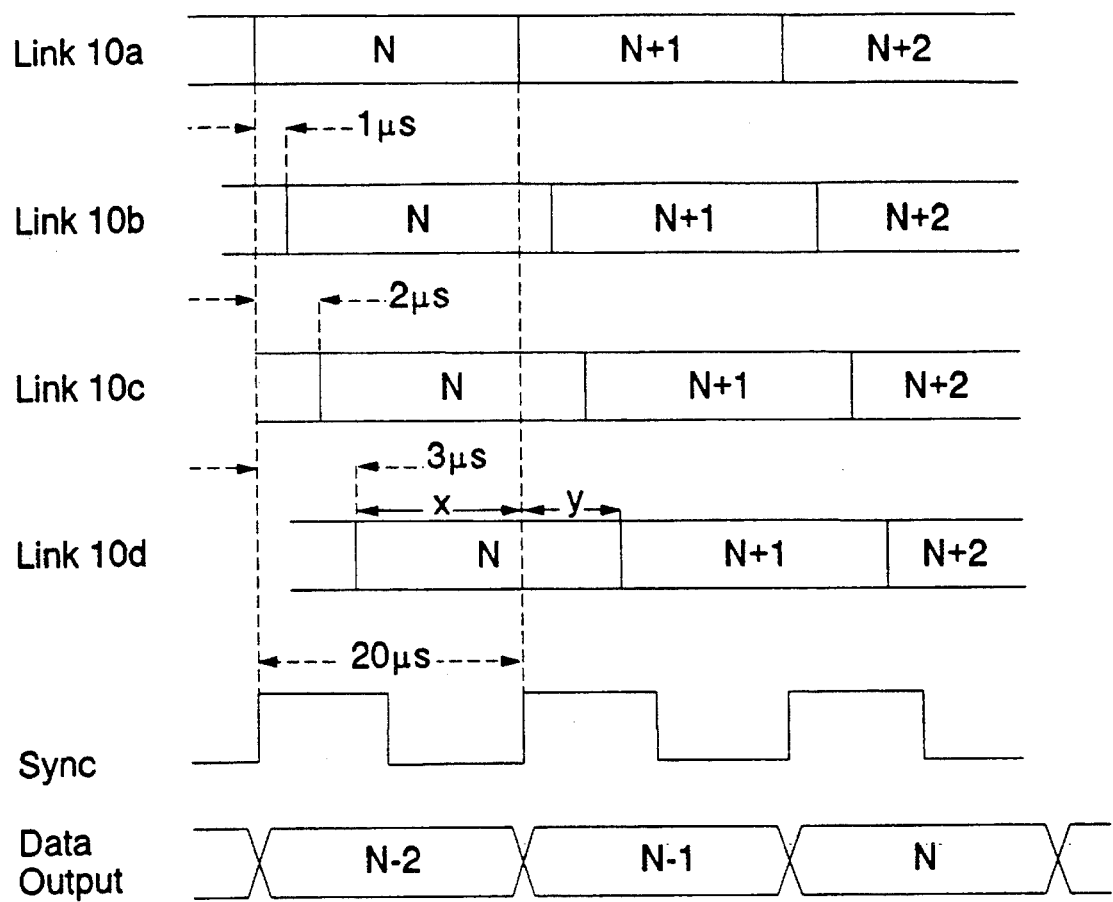
FIG. 5b is a timing diagram used in explaining the operation of the embodiment of FIG. 3 using the method of FIG. 4b.

FIG. 5b is a schematic timing diagram similar to that of FIG. 5a but illustrating the timing of transmission of MADI frames along the links 10a to 10d using the preferred data transmission method described above with reference to FIG. 4b. Again, the timing of frames is shown relative to the SYNC signal supplied to each device in the ring network by the SYNC connections 11, and the timing of data output by devices relative to the SYNC signal is also shown.

As in FIG. 5a, the top line in FIG. 5b shows schematically successive MADI frames N, N+1, N+2 transmitted along the link 10a by the mixer 5, the start of transmission of each of these frames being triggered by the positive edge of the SYNC signal. Onward transmission of the frame N along the link 10b by the AES/EBU rack 8 commences one microsecond after transmission along the link 10a has started, and thus well before transmission along the link 10a has ceased as previously described with reference to FIG. 4b. (The 1 microsecond period has been exaggerated in the figure for clarity.) Transmission along the link 10b is triggered by an internal timer in the AES/EBU rack 8 which counts one 1 microsecond period following the positive edge of the SYNC signal prior to commencing transmission. Similarly, onward transmission of the frame N along the link 10c commences one microsecond after transmission along the link 10b has started, and thus two microseconds after the positive edge of the SYNC signal. Again, an internal timer in the DAC rack 15 counts two 1 microsecond periods from the positive edge of the SYNC signal prior to commencing transmission. Finally, onward transmission of the frame N along the link 10d commences one microsecond after transmission along the link 10c has started. Again, an internal timer in the ADC rack 16 counts three 1 microsecond periods following the positive edge of the SYNC signal before commencing transmission along the link 10d. Transmission of frame N+1 on the link 10a by the mixer 5 commences with the next positive edge of the SYNC signal, and the above process is repeated for onward transmission of the frame N+1 around the ring network.

The bottom line in FIG. 5b again shows the timing of the output of data received from the network by the link connection circuitry in each of the master and slave devices. Data output by devices is again triggered by the positive edge of the SYNC signal. As before, data received by the devices 5, 8, 15, 16 in FIG. 3 as a given MADI frame circulates round the ring network should be output simultaneously by the devices. Thus, considering the receipt of data by the mixer 5 from the link 10d, a sequence of channels ("x" in the figure) of the frame N transmitted along the link 10d is received by the mixer 5 prior to the next positive edge of the SYNC signal which triggers the start of transmission of frame N+1 around the ring network by the mixer 5. However, a sequence of channels (indicated as "y" in the figure) at the end of frame N is not received by the mixer 5 from the link 10d until after the positive edge of the SYNC signal which triggers transmission of frame N+1. The frame N is therefore fully received by the link connection circuitry in the mixer 5, and hence can be output to the mixing processor in the mixer, on the second positive edge of the SYNC signal following the start of transmission of frame N along the link 10a. Thus, as shown in the figure, as frame N is transmitted along the link 10a, data corresponding to frame N−2 is output by each device in the network which extracted data from frame N−2. Using this data transmission method, therefore, the delay introduced by each device in the network, and hence the memory capacity required in each device, is significantly reduced as compared with the data packing method. Further, there is only a two-frame delay between transmission of data by the mixer and output of that data by slave devices. This is clearly the case regardless of the number of devices in the ring network provided that the cumulative delay introduced by all the devices in the network does not exceed one SYNC period.

As previously described, the encoding scheme utilised by the embodiments of the invention illustrated herein is based on the ANSI X3T9.5(FDDI) committee's 4–5 bit code defined in ANSI X3T9.5/88-148, whereby data to be transmitted is treated as successive 8-bit bytes, each 8-bit byte being divided into two 4-bit nibbles. Each 4-bit nibble is then encoded into a 5-bit symbol according to a 4–5 bit NRZ encoding scheme, and the NRZ code bits are then transmitted using an NRZI polarity-free encoding. Of the 32 bit patterns possible for a 5-bit symbol, 16 are chosen as "data symbols" and are used solely for encoding MADI frames. Thus, each of the 16 data symbols corresponds to one of the 16 possible 4-bit data patterns of a 4-bit nibble of a MADI frame. As previously indicated, of the remainder of the 32 possible 5-bit symbols, some are reserved as "command symbols". In the FDDI system referenced above, these command symbols are used for various transmission control and indicator functions associated with the transmission of data on a network. In the embodiments to be described, these command symbols are utilised in a quite different way as will now be described with reference to the table of FIG. 6.

The second column in the table of FIG. 6 shows the bit patterns for 16 command symbols, each of which consists of two 5-bit command symbols. The 16 command symbols are numbered 0 to F in hexadecimal as indicated in the left hand column of the table. The name of each command symbol is also given in the third column of the table in accordance with the definitions in ANSI X3T9.5/88-148. The function of each of the command symbols in the embodiments of the present invention described herein is indicated in the fourth column of the table.

Of command numbers 0 to 7, only commands 0 and 4 are utilised by the embodiments described herein. Command 0 performs a synchronisation function specified by the MADI standard (AES 10-1991, 373, 3.3.2) which requires that a synchronisation symbol with the bit pattern 11000 10001 shall be inserted into the data stream at least once per frame period to ensure transmitter and receiver synchronisation. Command 4 is used as a "sample address load" (SAL) signal the purpose of which will be described below. Command numbers 8 to F are used to encode HDLC (High-Level Data Link Control) format signals by means of which the set-up data and control data referred to above is communicated over the ring network. The HDLC protocol is well-known in the field of computer networks and so the characteristics of HDLC will not be discussed in detail here. In the embodiments described herein, however, 3-bit nibbles of the HDLC format data are encoded into 10-bit command symbols as indicated in the table, where "HDLC 0" signifies a 3-bit nibble with a bit pattern of 000, "HDLC 1" signifies a 3-bit nibble with a bit pattern 001, "HDLC 2" signifies a 3-bit nibble with a bit pattern 010, and so on up to HDLC 7 which signifies a 3-bit nibble with a bit pattern of 111. Thus, successive 3-bit nibbles of the HDLC format data are converted into the appropriate 10-bit command signals for transmission over the ring network. Similarly, commands 8 to F received from the network are converted into the corresponding 3-bit nibbles of HDLC format signals.

HDLC can be used in this way for communication of set-up and control data because the total data transfer capability of the network is sufficiently greater than that required for MADI communication as will now be illustrated. As previously indicated, the ring networks in the embodiments of the invention described herein operate at a data transmission rate of $100 \times 5/4 = 125$ Mbps. For MADI communication of digital audio data, the maximum used digital audio data transmission rate is 120.96 Mbps. Further, as indicated above, the MADI standard requires a 10-bit synchronisation symbol (command 0 in FIG. 6) to be transmitted once per frame and this utilises a further $10 \times (54 \times 10^3) = 0.54$ Mbps of the link transmission capability. Since 3 bits of HDLC data are encoded into 10 bit command symbols, the resulting data transfer rate available for the HDLC is $(125 - 120.96 - 0.54) \times 3/10 = 1.05$ Mbps which is an acceptable data transfer rate according to the HDLC protocol.

Thus, in embodiments of the invention, the HDLC protocol can be used to transmit the set-up commands and responses discussed earlier whereby channels within MADI frames are allocated to devices in the network, and also the control commands and responses discussed earlier whereby the mixer can control the operation of devices in the network. For control communication, a standard remote control format may be utilised, these standard format signals being converted to HDLC format signals and then encoded as indicated in FIG. 6 prior to transmission. Since standard remote control protocols generally define a data transfer rate which is substantially less than the HDLC data transfer rate of about 1 Mbps, multiple channels of such a standard format can be handled by the HDLC. For example, if a standard remote control format specifies a data transfer rate of about 40 Kbps, then, allowing for, say, a redundancy coefficient of 2 due to the additional bits required for conversion to the HDLC format, the number of standard control format channels which can be handled by the HDLC is given by $1 \times 10^6 / (2 \times 40 \times 10^3) = 12.5$. Thus, 12 channels of the standard remote control format could be carried by each frame of the HDLC format.

With regard, to control communication in the network, since the MADI transmission format specifies a user-definable bit, it might be thought that these bits could be used for control signal transmission. However, since the user may require these bits for other purposes, it is preferable to handle control signal transmission using the HDLC as described above.

Figure 7:
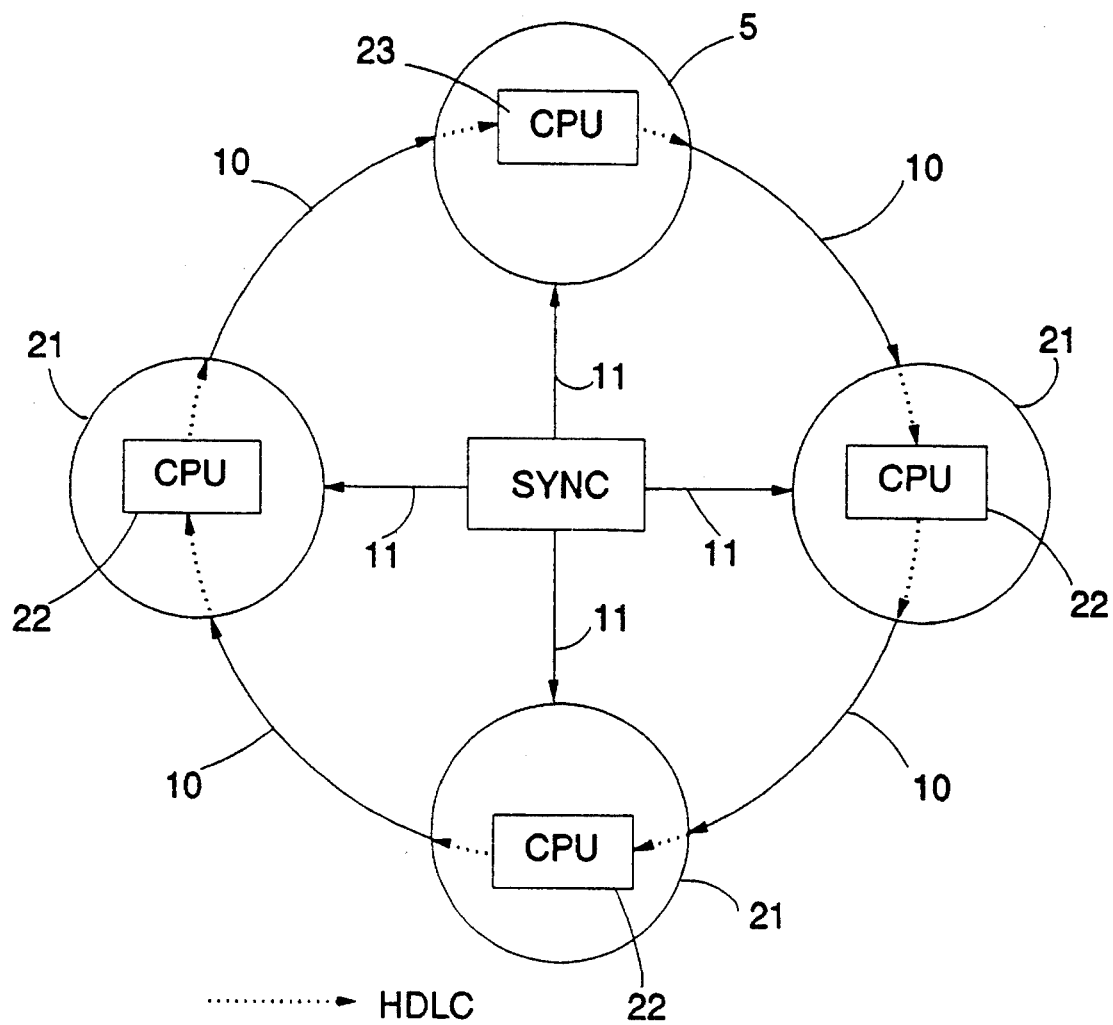
FIG. 7 is a schematic illustration of effective HDLC connections in apparatus embodying the invention.

FIG. 7 is a schematic diagram of a ring network embodying the invention, such as those shown in FIGS. 2 and 3, in which the effective HDLC connections are shown. Three device racks 21 such as those previously described are connected in the ring network with the mixer 5 by links 10. The HDLC connections, indicated by dotted lines in the figure, can be considered to connect a central processing unit (CPU) 22 in each device rack 21 to the incoming and outgoing links 10, and a CPU 23 in the mixer 5 to its incoming and outgoing links 10. In this HDLC loop network, the CPU 23 in the mixer 5 acts as the primary station, the CPUs 22 in the device racks 21 being secondary stations.

The control data communicated via the HDLC may include time codes from recording machines connected to the ring network. The construction and operation of that part of the link connection circuitry in slave devices which enables time codes to be handled in this way will be described in detail with reference to FIG. 12. However, the basic principle will now be described briefly with reference to FIG. 8.

Figure 8:
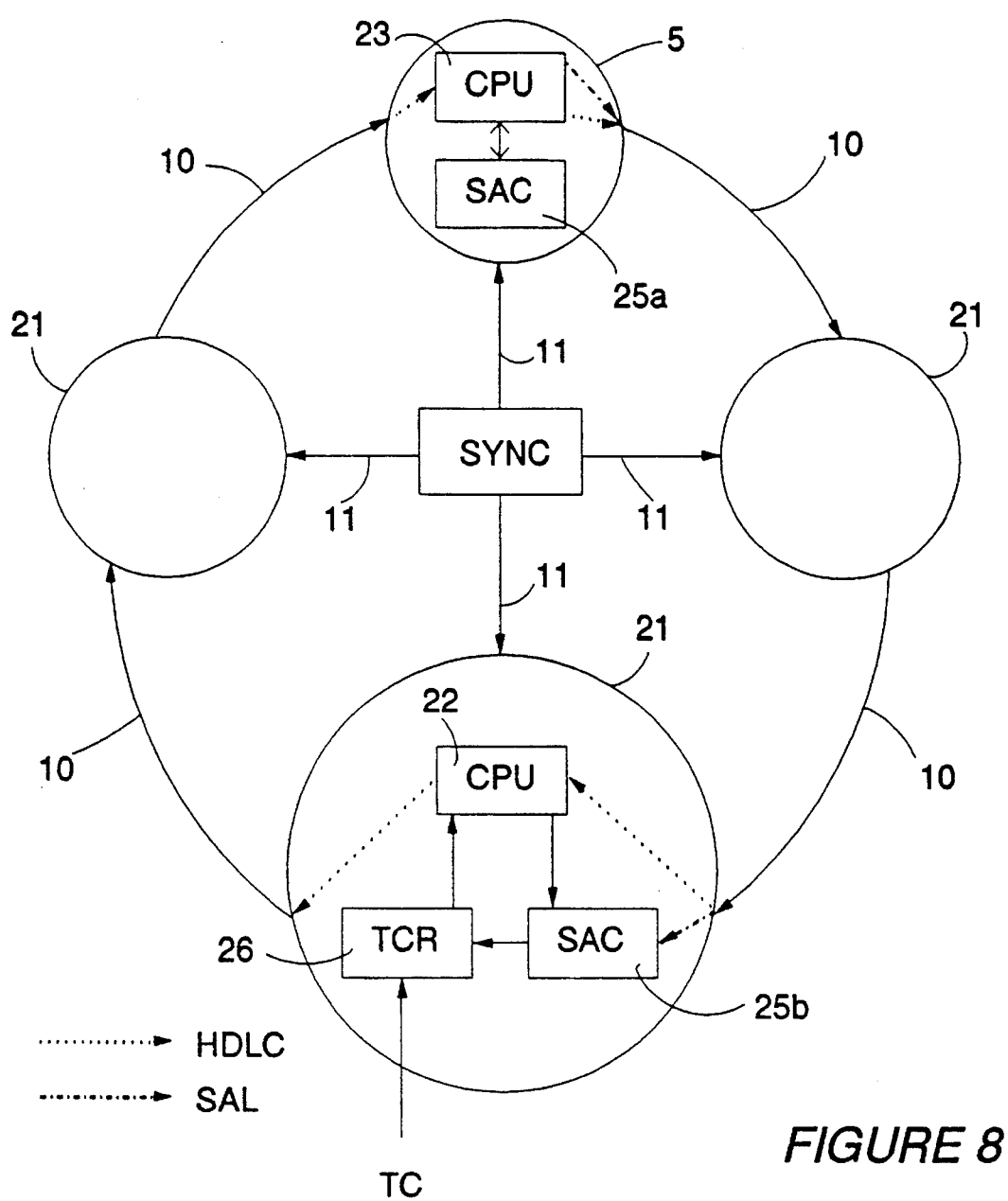
FIG. 8 illustrates schematically the handling of time codes in apparatus embodying the invention.

FIG. 8 is a schematic diagram corresponding to FIG. 7 illustrating how time codes can be handled using the HDLC network of FIG. 7 where, as before, the effective HDLC connections are indicated by dotted lines. The time code from, for example, a peripheral recording device connected to one of the racks 21 in the ring network must be transmitted to the mixer 5 so that the mixer can identify precisely the portion of recorded material being reproduced by the peripheral recording machine at any time. The time code can be transmitted around the ring network to the mixer 5 via the HDLC connections, but the mixer 5 must be able to account for the HDLC transmission delay. This is achieved in the following manner.

As shown in the figure the mixer 5 includes a master sample address counter (SAC) 25a which is a free-running counter clocked by the master synchronising signal (SYNC). Each device rack 21 which handles time codes (ie a device rack which is itself a recording device or which serves as a gateway for a peripheral recording device) also contains its own SAC 25b which is also clocked by SYNC. Only one such device rack 21 is shown in the figure for simplicity. As will be described in mope detail with reference to FIG. 12, the count on the master SAC 25a in the mixer 5 can be duplicated to the SAC 25b in the device rack 21 using HDLC signals and the sample address load (SAL) signal (command 4 in the table of FIG. 6) which serves as a trigger signal transmitted from the CPU 23 in the mixer to the SAC 25b in the device rack via the effective SAL connections indicated by dash-dotted lines in the figure. Once this has been done the SAC 25b is synchronised with the master SAC 25a.

The device rack 21 which handles time codes also incorporates a time code register (TCR) 26. A time code (TC) from the peripheral recording device is latched to the TCR 26 in the device rack 21, and the sample address (SA), ie the reading of the SAC 25b in the device rack 21 at that time, is latched to the TCR 26 at the same time as the time code. TC and SA are then transmitted to the mixer 5 from the CPU 22 by means of the HDLC. The mixer can then calculate the correct value of the time code for the time at which it receives this data using the count of the master SAC 25a within the mixer 5 when the data is received according to the following expression:

$$TC_R = TC + (SAC_R - SA)/FS$$

where: $TC_R$ is the correct value of the time code at the time the mixer 5 receives the time code; $SAC_R$ is the reading of the master sample address counter 25*a* at this time; and FS is the frequency of the master synchronising signal (SYNC) which clocks the SACs 25*a* and 25*b*. Using this method, the mixer 5 can determine the precise tape location on any recording machine connected to the ring network in spite of the HDLC transmission delay. This method can be used to handle various different time codes such as the SMPTE of EBU time codes.

Figure 9:
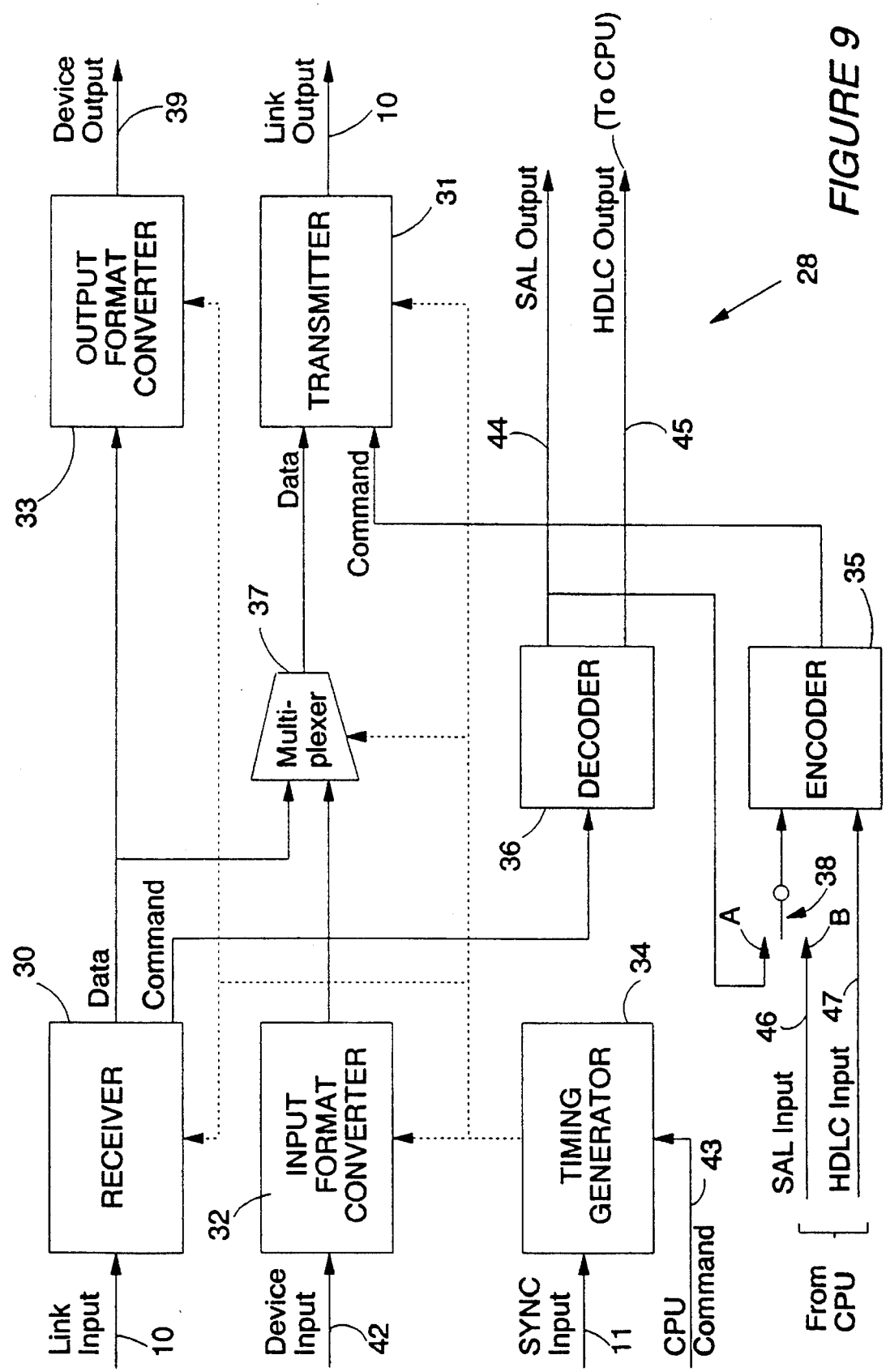
FIG. 9 is a schematic block diagram of a link connection circuit for use in master and slave devices embodying the invention.

FIG. 9 is a block diagram of a generalised form of link connection circuit which can be configured for use in either the mixer 5 or a device rack 21 in a ring network embodying the invention. The link connection circuit, generally indicated at 28, comprises a receiver 30 which receives an input from the link 10 connected to the preceding device in the ring network. The receiver 30, which may be, for example, the Am7969 receiver produced by Advanced Micro Devices Inc, decodes the link input into data (ie audio data) and command signals, the difference between the two being identifiable since certain bit patterns are reserved for command symbols as explained with reference to FIG. 6. The data signals are routed to a data output of the receiver and the command signals are routed to a command output of the receiver. The data output of the receiver 30 is connected to an output format converter 33 which operates under timing control (indicated by broken lines in the figure) provided by a timing generator 34. When activated by the timing generator 34, the format converter 33 converts audio data output by the receiver 30 into the format of a device to which the audio data is to be supplied. (As explained below with reference to FIGS. 10 and 12, where the circuit 28 is incorporated in a mixer 5, the audio data will be supplied to a mixing processor, and where the circuit 28 is incorporated in a device rack 21 the audio data will be supplied to a peripheral device for example.) The format converted audio data is supplied to a device output 39 of the output format converter 33 at timings controlled by the timing generator 34.

The data output of the receiver 30 is also connected to one input of a multiplexer 37. A further input of the multiplexer 37 is connected to the output of an input format converter 32. The input format converter 32 has a device input 42 connected to the device (eg a mixing processor or peripheral device) from which audio signals are supplied for transmission around the ring network. Audio signals supplied to the device input 42 are converted into the internal data format by the format converter 32 which then supplies the format converted signals to the multiplexer 37 at timings controlled by the timing generator 34. The multiplexer 37 also operates under control of the timing generator 34 to supply signals on one or other of its two inputs to its output. The output of the multiplexer 37 forms one input to a transmitter 31 which may be, for example, the Am7968 transmitter produced by Advanced Micro Devices Inc. The output of the transmitter 31 is connected to the outgoing link 10 in the ring network. Thus, the multiplexer 37 supplies to the transmitter 31 audio data which is to be transmitted on round the ring network. This audio data may comprise audio data received from the incoming link 10 and audio data supplied to the device input 42 of the circuit.

The command data output by the receiver 30 is supplied to a decoder 36 where the commands are decoded to SAL and HDLC format signals which are supplied to a SAL output 44 and an HDLC output 45 respectively. As described earlier with reference to FIG. 7, the HDLC output 45 is connected to the CPU 22 or 23 of the device rack 21 or mixer 5 as appropriate. As previously mentioned with reference to FIG. 8, the SAL signals are essentially trigger signals for synchronising the sample address counters 25*b* in device racks which handle time codes with the master sample address counter 25*a* in the mixer. Thus, in such devices, the SAL output 44 is connected to a time code handler which incorporates the sample address counter 25*b* and which will be described further below with reference to FIGS. 11 and 12.

The SAL output of the decoder 36 is also connected to a contact A of a switch 38. When the circuit 28 is incorporated in a device rack 21, the switch 38 connects the contact A to one input of an encoder 35. With the switch in this position, SAL signals received from the network and supplied to the SAL output of the decoder 36 are supplied to the encoder 35. When the circuit 28 is incorporated in a mixer 5, the switch 38 will be positioned to connect a contact B to the encoder 35. The switch contact B is connected to a SAL input 46 which receives SAL signals generated by the CPU 23 of the mixer. In this position of the switch, therefore, SAL signals generated by the CPU of the mixer to be transmitted round the ring network are supplied to the encoder 35.

Another input to the encoder 35 is an HDLC input 47 which receives HDLC signals from the CPU 22, 23 of the device rack or mixer as appropriate. The encoder 35 encodes the SAL and HDLC format signals received at its inputs into the internal command format and the encoded signals are supplied to a command input of the transmitter 31.

The transmitter 31 thus receives at its inputs data from the multiplexer 37 and commands from the encoder 35. These input signals are encoded into the transmission format by the transmitter 31 and transmitted on the outgoing link 10 at timings controlled by the timing generator 34.

The timing generator 34 receives the master synchronising signal from the sync input 11, and also CPU command signals on an input 43 which is connected to the CPU 22 or 23 of the device rack or mixer as appropriate. The CPU controls the operation of the timing generator 34 by means of the CPU command signals as will be explained below.

Figure 10:
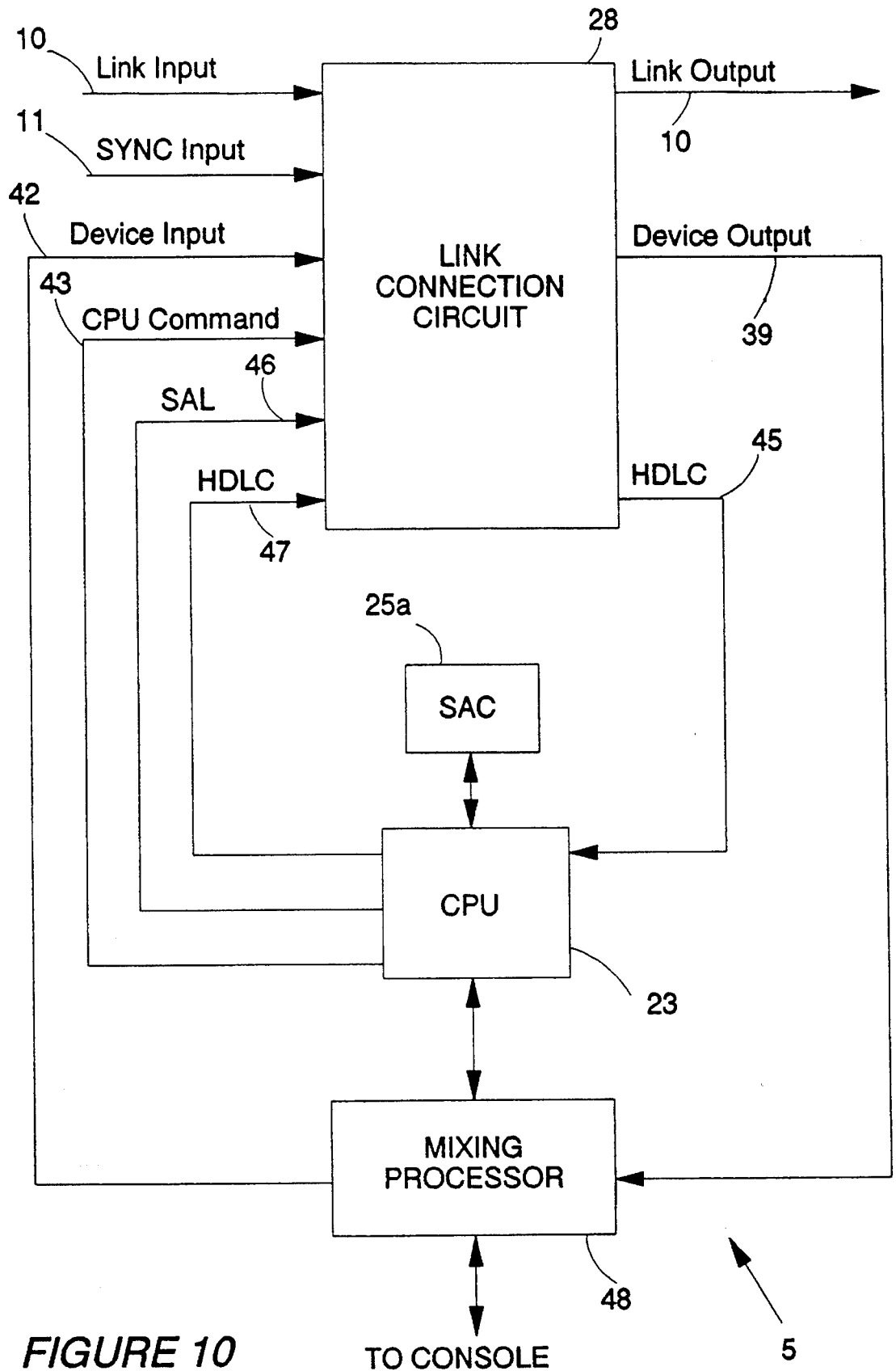
FIG. 10 illustrates schematically how the link connection circuit of FIG. 9 is connected in a digital mixer.
Figure 11:
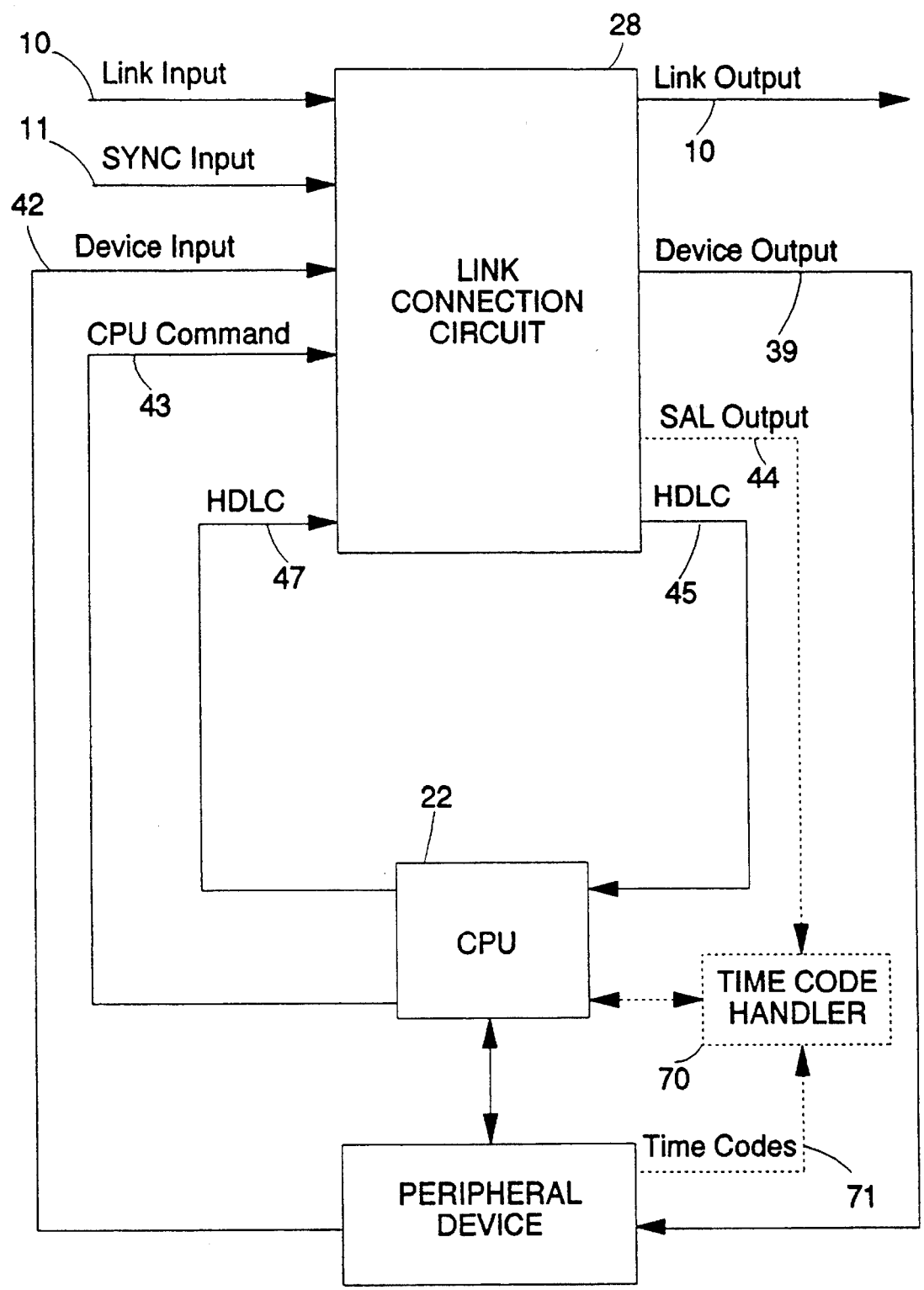
FIG. 11 illustrates schematically how the link connection circuit of FIG. 9 is connected in a device rack.

FIGS. 10 and 11 show how the link connection circuit 28 of FIG. 9 is connected in a mixer 5 and device rack 21 respectively. In each case, only the operative inputs/outputs of the circuit 28 are shown. Thus, the SAL input 46 shown in FIG. 9 is omitted in FIG. 11 as this input is only utilised when the connection circuit 28 is utilised in a mixer. Similarly, in FIG. 10 the SAL output 44 shown in FIG. 9 is omitted since this output is utilised only in device racks. In each diagram, the connections between the link connection circuit 28 and the CPU 22 or 23 are shown. In FIG. 10, the device input 42 and device output 39 of the link connection circuit 28 are shown connected to the mixing processor 48 of the mixer 5. In the circuit of FIG. 11, the device input 42 and device output 39 of the circuit 28 are shown connected to a peripheral device of the rack. The portion of FIG. 11 which is shown in broken lines is required only in device racks which handle time codes. In this case, the SAL output 44 of the link connection circuit 28 is connected to a time code handler 70 which in turn is connected for communication with the CPU 22 of the device rack. The time code handler 70 will be described further below with reference to FIG. 12. The operation of the mixer 5 and device racks 21 in the ring network will now be described in detail with reference to FIGS. 9 to 12.

On initial set up of the ring network, the mixer 5 must first determine the channel capacity and arrangement of all device racks 21 in the network. This process is triggered by a command entered by an operator at the control console of the mixer 5 And transmitted via the mixing processor 48 to the CPU 23 of the mixer 5 in FIG. 10. The CPU 23 then generates a set-up command signal for transmission around the ring network and each device rack will respond indicating the number of input and output channels which it is handling. The set-up command signal is transmitted in accordance with known HDLC procedures, the HDLC signals being supplied by the CPU 23 to the HDLC input 47 of the link connection circuit 28, and, via the encoder 35, to the transmitter 31. The transmitter 31 encodes the HDLC signals in accordance with the table of FIG. 6 for transmission along the outgoing link 10 from the mixer. On receipt by the first device rack 21 in the network, the receiver 30 in the device rack decodes the received signal into the internal command format and supplies the resulting signal to the decoder 36. The decoder 36 decodes the received signal into HDLC format signals which are supplied via the HDLC output 45 to the CPU 22 in the device rack. In response to the set-up command from the mixer 5, the CPU 22 in the device rack generates a response indicating its channel capacity. This response is supplied, along with the original request from the mixer, to the HDLC input 47 of the link connection circuit in the device rack and via the encoder 35 and transmitter 31 in the device rack onward via the outgoing link 10 to the next device rack. The next device rack operates in a similar manner, the CPU 22 appending a response indicating the rack's channel capacity to the signal received via the HDLC connection and transmitting the signal onward round the network. The responses from the device racks are eventually received as command signals by the receiver 30 of the mixer 5, and decoded to HDLC format and supplied to the CPU 23.

From the responses received from the device racks, the CPU 23 can determine the arrangement and channel capacities of the device racks in the network. The CPU 23 in the mixer then determines a suitable data flow system for the network whereby each device rack can add and/or extract audio data to or from a MADI frame circulating round the network in accordance with its function. For the reasons previously described with reference to FIGS. 3 to 5, the network is arranged to operate without data packing in the device racks, and so the CPU 23 in the mixer determines appropriate channel allocations for device racks in accordance with the method of FIG. 4b. The channel allocation for each device rack indicates the sequence of data blocks, or "channels", in MADI frames transmitted round the ring network which will be used by the mixer 5 to transmit audio data for output by that particular device rack. The channel allocations are then transmitted by the CPU 23 of the mixer to the CPUs 22 in each device rack via the HDLC connections.

If an appropriate data flow system is not possible for the network, for example because the total input channel capacity of all device racks in the network exceeds 56 (ie the number of channels in a MADI frame), then the CPU 23 will transmit a signal to the operator console via the mixing processor 48 and an appropriate indication will be given to the operator.

In addition to informing each device of its channel allocation, the CPU 23 of the mixer 5 also communicates to each device rack, by means of set-up command signals transmitted via the HDLC connections, the position of that device rack, ie first, second, third etc, around the ring network. This information is used by the CPU 22 in each device rack to control the timing generator 34, via the CPU command input 43, to effect the appropriate transmission delay for the device rack. Thus, as previously described with reference to FIGS. 4b and 5b, the first device rack around the ring network is set to a transmission delay of one microsecond, the second device rack is set to a transmission delay of two microseconds, and so on.

After communication of the set-up data as described above, audio data communications can commence on the ring network. The operation of the link connection circuit 28 in audio data communications will now be described using as an example the circuit 28 in the AES/EBU rack 8 in the ring network of FIG. 3.

The transmitter 31 in the mixer 5 is triggered by the timing generator 34 to commence transmission of a MADI frame containing the signals a, b on the positive edge of the SYNC signal supplied to the timing generator and the mixer. The signal a is to be output by the AES/EBU rack 8 to a peripheral device and the signal c from a peripheral device is to be inserted in the MADI frame. The MADI frame is received by the receiver 30 in the device rack 8. The receiver 30 is triggered by the timing generator 34 in response to the SYNC input 11 to decode the received frame into the internal data format and the decoded audio data is supplied to the multiplexer 37 and the output format converter 33 via the data output of the receiver 30.

In accordance with the channel allocation for the device rack, the CPU 22 controls the timing generator 34, via the CPU command input 43, to trigger the output format converter 33 to convert the portion of the received MADI frame corresponding to the channels allocated to that device, ie the portion of the MADI frame occupied by the signal a. At the same time, the timing generator 34 activates the input format converter 32 to convert the signal c received from the peripheral device into the internal data format for supply to the multiplexer 37. The multiplexer 37 is switched to the output of the input format converter 32 for the duration of the channels allocated to the device rack. Thus, the effect of the multiplexer 37 is to replace the signal a in the MADI frame supplied by the receiver 30 by the signal c supplied by the input format converter 32. After the period for which the signal a is output by the receiver 30, the timing generator 34 switches the multiplexer 37 to the input from the receiver 30. Thus, the remainder of the received MADI frame, ie the signal b in this example, is supplied to the output of the multiplexer 37. The transmitter 31 thus receives a MADI frame containing the signal c, followed by a sequence of vacant channels, followed by the signal b which occupies the same channel positions as in the frame originally transmitted by the mixer as shown in the second line of FIG. 4b.

As the data is received from the multiplexer 37, the transmitter 31 encodes the audio data for onward transmission on the outgoing link according to the encoding scheme described earlier. The transmitter 31 is triggered by the timing generator 34 to commence transmission of the outgoing MADI frame one microsecond after the positive edge of the SYNC signal as illustrated in FIG. 5b.

The MADI frame is thus transmitted on round the ring network, and the subsequent devices, ie the DAC 15 and ADC 16 in the example of FIG. 3, extract or add audio data in a similar manner and transmit the MADI frame on round the ring. The MADI frame containing the signals c, d is thus eventually received by the receiver 30 in the mixer 5.

In this example, the complete MADI frame received by the mixer 5 is to be supplied to the mixing processor 48 to produce the signals a, b for onward transmission. Thus, the CPU 23 in the mixer controls the timing generator 34 via the CPU command input 43 so that the output format converter 33 converts the complete MADI frame into the format of the mixing processor. The mixing processor 48 supplies mixed signals a and b to the device input 42 of the input format converter 32, and the timing generator 34 controls the multiplexer 37 so that the output of the format converter 32 is supplied to the transmitter 31 for the duration of a complete MADI frame. The MADI frame containing the signals a, b is then transmitted on to the AES/EBU rack 8, and the above process is repeated for the new frame.

In accordance with the MADI standard, a synchronisation symbol (command 0 in FIG. 6) is inserted into the transmitted bit stream once per frame by the transmitter 31 in each device. This symbol is identified by the receiver 30 in the next device in the network to ensure transmitter and receiver synchronisation.

Data "extracted" from a given MADI frame by the master and slave devices as the frame circulates round the network is output simultaneously by the output format converters 33 in the devices. Thus, as previously explained with reference to FIG. 5b, output of this data is triggered by the second positive edge of the SYNC signal following transmission of the original MADI frame. Transmission of the device output by the format converters 33 is triggered by the timing generators 34 after the appropriate time periods as set by the CPUs 22, 23 via the CPU command inputs 43 in the link connection circuits.

As described earlier, the receivers 30 and transmitters 31 are designed to operate at a data transmission rate of 125 Mbps which exceeds the required data transmission rate for MADI communication. The additional data transfer capability is used for control communication to allow an operator to control operation of the device racks and peripheral devices from the operator console of the mixer 5. Commands entered at the console, eg to control a peripheral recording machine or adjust the gain of an ADC/DAC rack, are supplied via the mixing processor 48 to the CPU 23 of the mixer 5. The control signals are sent by the CPU 23 of the mixer to the CPUs 22 of the device racks via the HDLC connections. The CPUs 22 control the devices accordingly and receive responses from the devices. The responses from the devices, eg indicating their status, are similarly sent from the CPU 22 of the corresponding device rack via the HDLC to the CPU 23 of the mixer and then, via the mixing processor 48, to the console for display to the operator.

As part of the control operation, time codes from any recording machines connected to the network must be communicated to the mixer in such a manner as the HDLC transmission delay is accounted for. This process, described briefly above with reference to FIG. 8, will now be described in detail.

Any device rack which handles time codes will incorporate the circuitry shown in the broken lines in FIG. 11. As shown in this figure, a time code handler 70 is connected between the SAL output 44 of the link connection circuit 28 and the CPU 22 of the rack. Time codes from a peripheral device are supplied directly to a time code input 71 of the time code handler. The time code handler 70 is shown in detail in FIG. 12.

Figure 12:
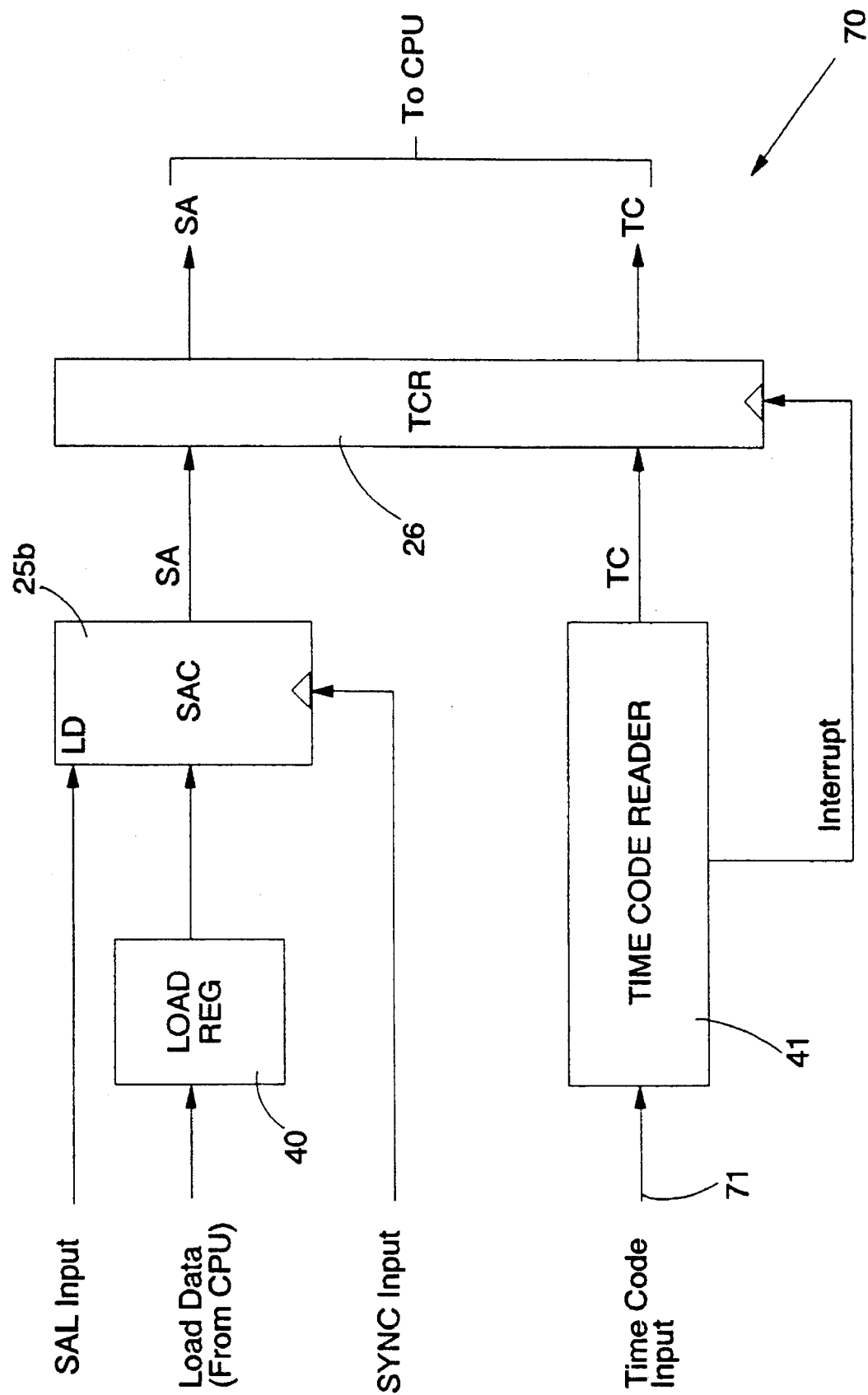
FIG. 12 is a schematic block diagram of a time code handler which may be connected to the link connection circuit of FIG. 9 in a device rack.

As shown in FIG. 12, the time code handler 70 comprises a load register 40 which is connected to the sample address counter (SAC) 25b referred to earlier with reference to FIG. 8. The circuit further comprises a time code reader 41 which is connected to the time code register (TCR) 26 also referred to earlier with reference to FIG. 8. The SAL output of the link connection circuit 28 is connected to a load input (LD) of the SAC 25b which also receives the master synchronising signal. The load register 40 has a "load data" input connected to the CPU 22 of the device rack whereby data can be loaded from the CPU into the register 40. An output of the load register 40 forms a further input to the SAC 25b. The output of the SAC 25b is connected to the TCR 26. The time code input 71 supplies time codes from the peripheral recording device to the time code reader 41 which decodes and outputs the time codes to the TCR 26. The time code reader 41 also provides an interrupt output to the TCR 26 for latching the TCR.

As shown in FIG. 10, the SAC 25a in the mixer 5 is connected to the CPU 23. As previously described with reference to FIG. 8, the SAC 25a is essentially a free-running counter clocked by the SYNC signal. The count of the SAC 25a is duplicated to the SACs 25b in device racks which handle time codes as follows. The CPU 23 transmits to the device rack, via the HDLC connections, a count value to which the SAC 25b is to be set on subsequent receipt of a trigger signal from the mixer 5. This count value indicates what the count on the SAC 25a will be when the device rack receives the trigger signal. The count value received by the CPU 22 of the device rack is loaded into the load register 40 via the load data input to this register. The CPU 23 of the mixer 5 later issues a SAL signal which is supplied to the SAL input 46 of the link connection circuit 28 in the mixer. Since the switch 38 is set to connect this input to the encoder 35, the SAL signal is supplied, via the encoder 35, to the transmitter 31 where it is encoded as command 4 in the table of FIG. 6. The SAL signal is then transmitted onto the ring network, decoded as command data by the receiver 30 of the device rack and further by the decoder 36 which provides the SAL signal on the SAL output 44. If the device rack receiving the signal does not handle time codes, then the SAL signal is simply supplied via the switch contact A to the encoder 35 and, via the transmitter 31 on round the network to the next device rack. When the device rack which handles time codes receives the SAL signal, this is supplied by the SAL output 44 of the decoder 36 to the load input LD of the SAC 25b. This causes the count value stored in the load register 40 to be loaded into the SAC 25b. The SAC 25b is then synchronised with the master SAC 25a in the mixer.

When a time code is received from the peripheral device by the time code handler 70, the time code reader issues an interrupt signal which causes the time code TC output by the time code reader and the sample address SA, ie the count of the SAC 25b, to be latched simultaneously to the TCR 26. TC and SA are then output by the TCR 26 to the CPU 22 in the device rack and are transmitted on round the network via the HDLC connections to the mixer 5. As explained with reference to FIG. 8, the CPU 23 in the mixer can then calculate the correct value of the time code at the time of receipt from the formula $TC_R=TC+(SAC_R-SA)/FS$.

It will be seen from the above that in ring networks embodying the invention, not only can digital audio data be communicated in MADI format on the ring network, but control communication between the mixer and devices can be achieved via the same communication links. The ring network provides a substantial saving in system hardware, and simplification of system interconnection, as compared with an equivalent system employing separate point-to-point connections between the mixer and each slave device. The system interconnection is further simplified since independent control communication links are not required. In addition, the network can span substantially greater areas since the restrictions on cable lengths specified by known remote control protocols for control communication via independent control links are obviated.

Since the MADI format is used for digital audio communication in the above embodiment, the mixer 5 can readily cope with conventional point-to-point communication with existing MADI devices. Such devices will not of course recognise the set-up data transmitted by the mixer via the HDLC on initial connection. Thus, the CPU 23 in the mixer 5 can be programmed such that, if no response is received to HDLC signals transmitted on set-up, a conventional MADI connection is assumed to have been made. On instruction from the CPU 23, the timing generator 34 then controls the multiplexer 37 so that the input format converter 32 is always connected to the transmitter 31. Thus, only data received from the mixing processor 48 is transmitted on the outgoing link 10. Similarly, the timing generator 34 controls the output format converter 33 such that all data received from the incoming link 10 is output to the mixing processor 48. The circuit is then configured for conventional point-to-point MADI communication with the device, all control communication being achieved in known manner via a separate control link between the mixer and MADI device.

Figure 13:
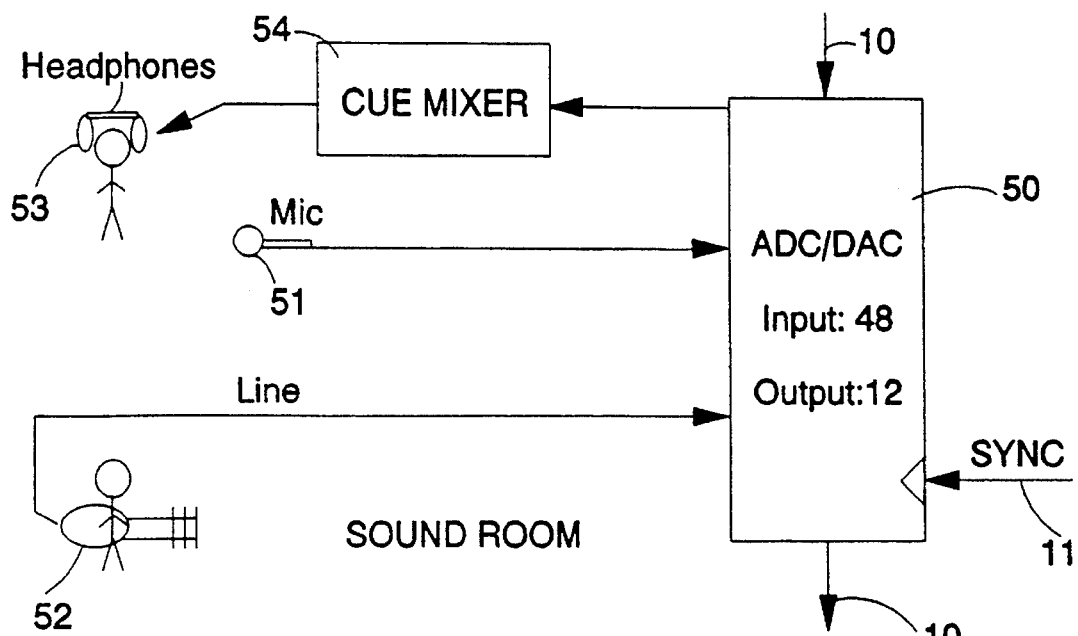
FIG. 13 is a schematic illustration of the sound room of a studio utilising data communications apparatus embodying the invention.
Figure 14:
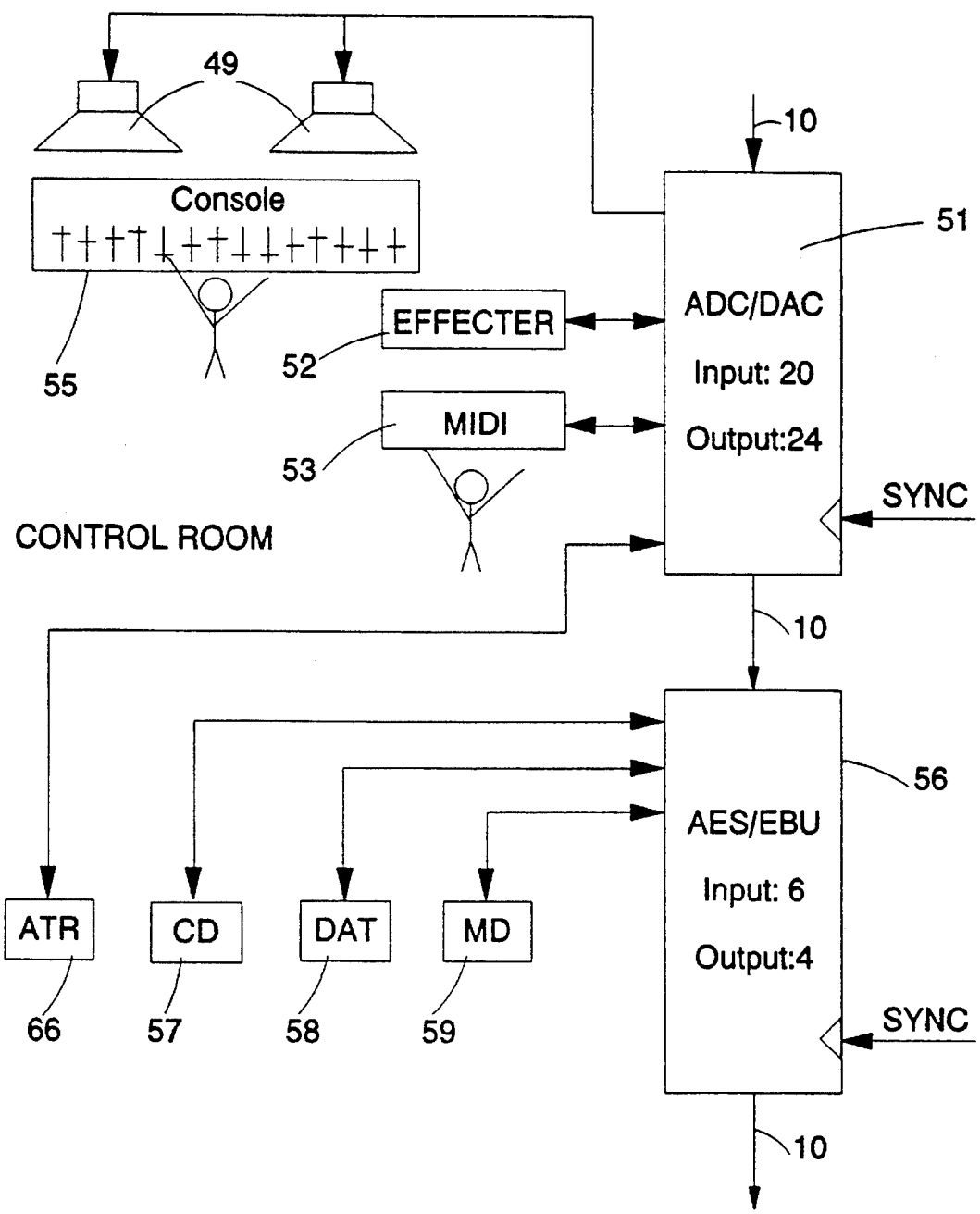
FIG. 14 is a schematic illustration of the control room of a studio utilising data communications apparatus embodying the invention.
Figure 15:
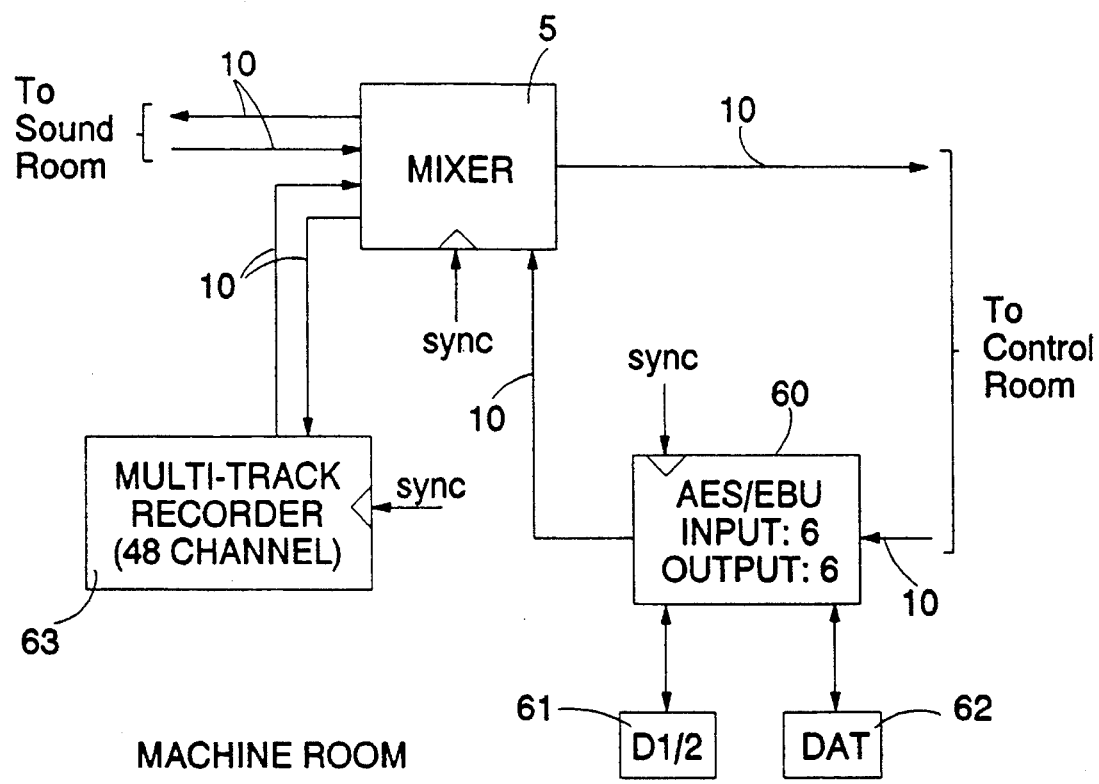
FIG. 15 is a schematic illustration of the machine room of a studio utilising data communications apparatus embodying the invention.

FIGS. 13, 14 and 15 each show an example of one room of a typical music or video post-production studio employing communications apparatus embodying the invention. The studio comprises three rooms, a sound room, a control room, and a machine room. FIG. 11 shows a typical sound room which is the room utilised by musicians. The sound room in this example contains an ADC/DAC rack 50 connected by links 10 to a mixer (not shown) which is located in another room of the studio. The ADC/DAC rack 50 incorporates the link connection circuit 28 previously described with reference to FIGS. 9 and 11 and receives a master synchronising signal from a SYNC connection 11 for the purposes hereinbefore described. The rack 50 has 48 input data channels for receiving analogue signals from peripheral devices such as microphones 51 and musical instruments 52, only one of each being shown in the figure for clarity. The rack 50 also has twelve output data channels for supplying analogue signals to peripheral devices such as headphones 53 via a cue mixer 54 for example. Again, only one set of headphones 53 is shown for clarity, though the twelve channel output capability of the ADC/DAC rack 50 enables up to six pairs of headphones to receive stereo signals from the ADC/DAC rack.

Since the ADC/DAC rack 50 has only twelve output data channels, only twelve channels in any incoming MADI frame are required for communication from the mixer to the ADC/DAC rack 50. However, since the ADC/DAC 50 handles 48 input channels, 48 channels are required in an outgoing MADI frame for communication of audio data from the ADC/DAC 50 to the mixer. Since each MADI frame consists of 56 channels, the outgoing link 10 in FIG. 11 could be connected to a device having a maximum of 56−48=8 output channels and a maximum of 8 input channels, such a device being connected by a further link 10 back to the mixer. However, in the present example no such further device is utilised and the ADC/DAC rack 50 is connected directly to the mixer by the incoming and outgoing links 10 shown in FIG. 13. Of course, the ADC/DAC rack 50 could be implemented as two racks, ie an ADC rack and an independent DAC rack both connected in the same ring network with the mixer.

FIG. 14 shows an example of the arrangement of a control room of the studio. This room contains an ADC/DAC rack 51 similar to the rack 50 in the sound room of FIG. 13 but having different input and output data channel capacity. The rack 51 has 24 output data channels for providing analogue output signals to peripheral devices connected thereto, and 20 input data channels for receiving analogue input signals from peripheral devices. Various peripheral devices such as effectors 52, MIDIs (musical instrument digital interfaces) 53, speakers 49, and analogue tape recorders (ATRs) 66, for example, may be connected to the ADC/DAC rack 51. The control room generally also contains the mixing console by means of which an engineer controls operation of the mixer (which is located in another room of the studio in the present example) as previously described. The ADC/DAC rack 51 is connected in a ring network with the mixer by means of links 10. The mixing console 55 is connected directly to the mixer by independent connections not shown in the figure.

The control room also contains an AES/EBU rack 56 connected in the ring network with the ADC/DAC 51. The AES/EBU rack 56 is connected to a plurality of AES/EBU format devices such as compact disc players (CDs) 57, DATs 58, and disc recorders (MDs) 59, only one of each being shown in the figure. The AES/EBU rack 56 has six input data channels for receiving signals from the peripheral devices 57, 58 and 59, and four output data channels for outputting signals to its peripheral devices. The ADC/DAC rack 51 and AES/EBU rack 56, each of which incorporates the circuitry described with reference to FIGS. 9 and 10, communicate with the mixer via the ring network as hereinbefore described.

Only 24 channels in any MADI frame received by the ADC/DAC rack 51 from the incoming link 10 from the mixer are required for use by that rack, 20 channels being utilised by this rack in any MADI frame transmitted onward via its outgoing link 10 to the AES/EBU rack 56. The AES/EBU rack 56 utilises only four channels in any incoming MADI frame and six channels in an outgoing MADI frame transmitted on round the ring network. Thus, the maximum number of channels utilised by the racks 51 and 56 together in a MADI frame received by the ADC/DAC 51 is 24+4=28. Similarly, the maximum number of channels utilised by the racks 51 and 56 together in a MADI frame output by the AES/EBU rack 56 is 20+6=26. Thus, the ring network containing the racks 51, 56 can support a further device connected between the mixer and the rack 51 having a maximum of 56−28=28 output data channels and 28 input data channels, or a device connected between the rack 56 and the mixer having a maximum of 28 output data channels and 56−26=30 input data channels.

FIG. 15 shows a typical machine room of the studio in which the digital mixer 5 is located. The links from the sound room and control room are thus connected to the mixer 5 as indicated in the figure. In the figure, an AES/EBU rack 60, having six input data channels and six output data channels, is shown connected by links 10 in the same ring network as the racks located in the control room, ie the ADC/DAC rack 51, and the AES/EBU rack 56. The AES/EBU rack 60 in the machine room may be connected to peripheral devices such as D1 or D2 format digital VTRs (D1/2) 61, and DATs 62, only one of each being shown in the figure for clarity. A multi-track tape recorder 63 having 48 input and output data channels is connected independently to the mixer 5 by links 10 as shown in the figure, the channel capacity of the multi-track recorder 63 being too great for it to be supported in the same ring network as the devices in the sound room or control room. The multi-track recorder 63 and the AES/EBU rack 60 each incorporate the circuitry described in relation to FIGS. 9 and 11. The mixer 5 incorporates one link connection circuit 28 as described in relation to FIGS. 9 and 10 for each of the ring networks which it supports.

Figure 16:
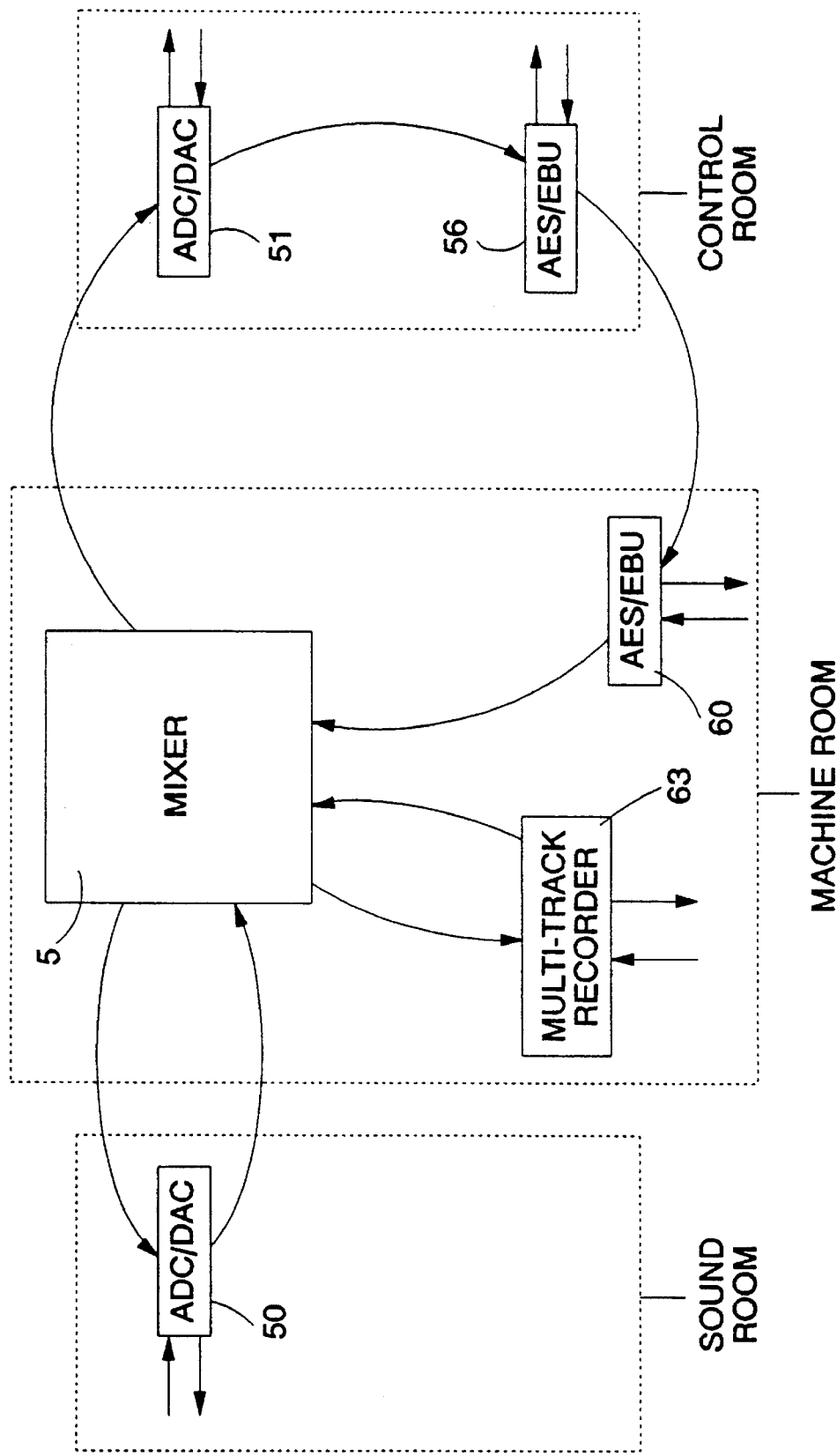
FIG. 16 illustrates the connection of a complete studio comprising the sound room, control room and machine room of FIGS. 13 to 15 respectively.

FIG. 16 shows the complete studio comprising the three rooms described in FIGS. 13, 14 and 15, the boundaries of each room being indicated by the broken lines in the figure. As is most clearly seen in FIG. 16, the studio utilises a total of three networks, one network incorporating devices in both the machine room and the control room. Operation of the networks and the devices therein is as hereinbefore described.

Of course, FIG. 14 provides only one example of the possible configuration of a studio utilising communications apparatus embodying the invention and many other arrangements are possible. In particular, in FIG. 16, the mixer 5 has connections for three networks, each connection being provided by a link connection circuit 28 as shown in FIG. 9. However, any of these connections (or further connections if provided) may be used for point-to-point interconnection of the mixer and a conventional MADI device. The mixer then configures the appropriate link connection circuit 28 for conventional MADI communication with the device as previously described with reference to FIG. 10.

Figure 17:
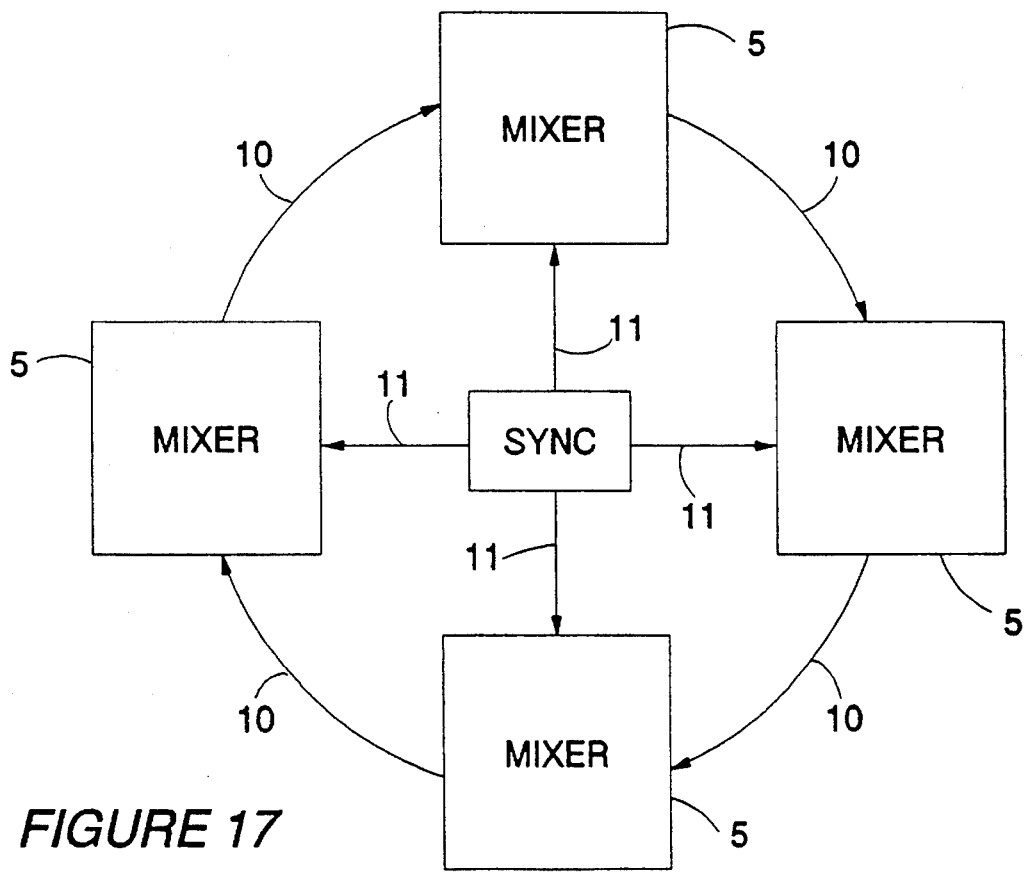
FIG. 17 illustrates schematically the connection of a number of studios utilising apparatus embodying the invention.

The mixer 5 in the studio of FIG. 16 may be connected by further links 10 in a ring network with mixers from other studios. Such an arrangement is illustrated schematically in FIG. 17. This figure shows mixers 5 from four studios such as that shown in FIG. 16 inter-connected in a further ring network by links 10. In this embodiment, any one of the mixers 5 in the ring network can serve as the master device, the other mixers serving as slave devices. The link connection circuits 28 which provide the interfaces with the incoming and outgoing links 10 in each of the slave mixers in the mixer network are thus configured as for slave devices as previously described with reference to FIGS. 9 and 11. Each slave mixer can in turn serve as the master device for its own studio, the link connection circuit(s) 28 interfacing with the studio network being configured as the master circuit of FIG. 10. The master mixer in the mixer network can therefore control operation of the slave mixers which in turn can control the devices in their respective studio networks. Each slave mixer can process data received from its studio network and transmit processed data to the master mixer via the mixer network. Similarly, data from the master mixer can be communicated to a device in a studio network by way of the appropriate slave mixer. In this way, communication between devices in more than one studio can be achieved, devices in one studio being operable from another studio, providing a highly flexible and efficient post-production system.

As has been explained previously, in the embodiments of the data communications apparatus described above, the operation of the mixer in the ring network is controlled by an operator via a control console connected to the mixer. Commands entered by the operator at the console, eg to control a peripheral recording machine or adjust the gain of an ADC/DAC rack, are supplied to the mixer which in turn controls the devices in the ring network accordingly. Similarly, responses from devices in the ring network indicating their status are sent via the ring network to the mixer, and then communicated by the mixer to the control console for display to the operator. This communication between the control console and mixer for a typical recording or processing session requires a data transfer rate between the console and mixer of for example 5 Mbps, and in practice this can be achieved by means of multiple point-to-point connections between the console and mixer. Further point-to-point connections with the mixer may be employed where a work station is utilised for storage and reproduction of automation data. The automation data defines a processing operation performed by the digital mixer during a processing session and consists essentially of control and timing information. For example, during an initial processing session, any process control commands, ie commands entered by an operator at the console and supplied to the digital mixer for controlling operation of the ring network, will be supplied by the mixing processor to the work station for recording as automation data. Similarly, any process control responses, ie responses transmitted by the mixer to the console indicating the status of devices in the ring network as described above, will also be transmitted by the mixer to the work station for recording as automation data. The work station records the process control commands and responses, together with appropriate timing information, so that the resulting automation file forms a record of the processes performed during the session. The advantage of this is that the results of the recording session can be reproduced for the purposes of monitoring and editing simply by reproducing the automation data stored by the work station. The work station reproduces the automation data and supplies the process control commands to the mixer at the appropriate timings so that the mixer performs the same processing operation as it performed during the initial session. Similarly, process control responses reproduced by the work station and supplied to the mixer are transmitted on by the mixer to the console so that the console displays to the operator the same status information as at the corresponding time during the initial processing session. During this "playback" session, the operator can monitor the reproduced results of the initial processing session and make any necessary modifications, for example, by adjusting the key, fader and volume controls on the console. During the playback session, the console can therefore be operated in the normal way, any "new" process control commands transmitted to the mixer, and process control responses transmitted back to the console, overriding any corresponding "old" process control commands and responses reproduced by the work station. As the operator edits the session by entering new commands at the console, the new process control commands and responses can also be transmitted to the work station to update the stored automation data.

As previously indicated, communication of the process control commands and responses between the console and mixing process during a typical session requires a data transfer rate of about 5 Mbps. The communication of automation data between the mixing processor and work station during a typical playback session requires a data transfer rate in the region of 50 Mbps. While this data transfer can be achieved by means of multiple point-to-point connections between the work station and mixer, and the mixer and console, this is inconvenient in view of the complex interface circuitry required to handle the communication and the overall complication of system interconnection. Further, the required data transfer rate cannot be achieved using the Ethernet transfer format which is one of the most popular interface formats for work stations in general.

According to preferred embodiments of the present invention, the required data communication between the mixer, console and work station is achieved by connecting these devices in a further, process control ring network on which process control data is formatted in frames corresponding to the frames of the digital audio data format used in the main ring network controlled by the mixer. In the embodiments described above, the MADI format is used for digital audio communication and this provides for an unencoded data transfer rate of $120.96 \times 4/5 = 96.768$ Mbps which is more than enough to handle the communication of process control data on the process control ring network. By connecting the mixing processor, work station and console in a process control ring network using the same format as the digital audio data format on the main processing network, the link connection circuit which forms the interface between devices in the main ring network and the incoming and outgoing links in that network can also be used as the interface circuit in devices in the process control ring network, with relatively little additional circuitry being required to handle the process control data. The operation of the process control ring network will now be described in detail with reference to FIGS. 18 to 21.

Figure 18:
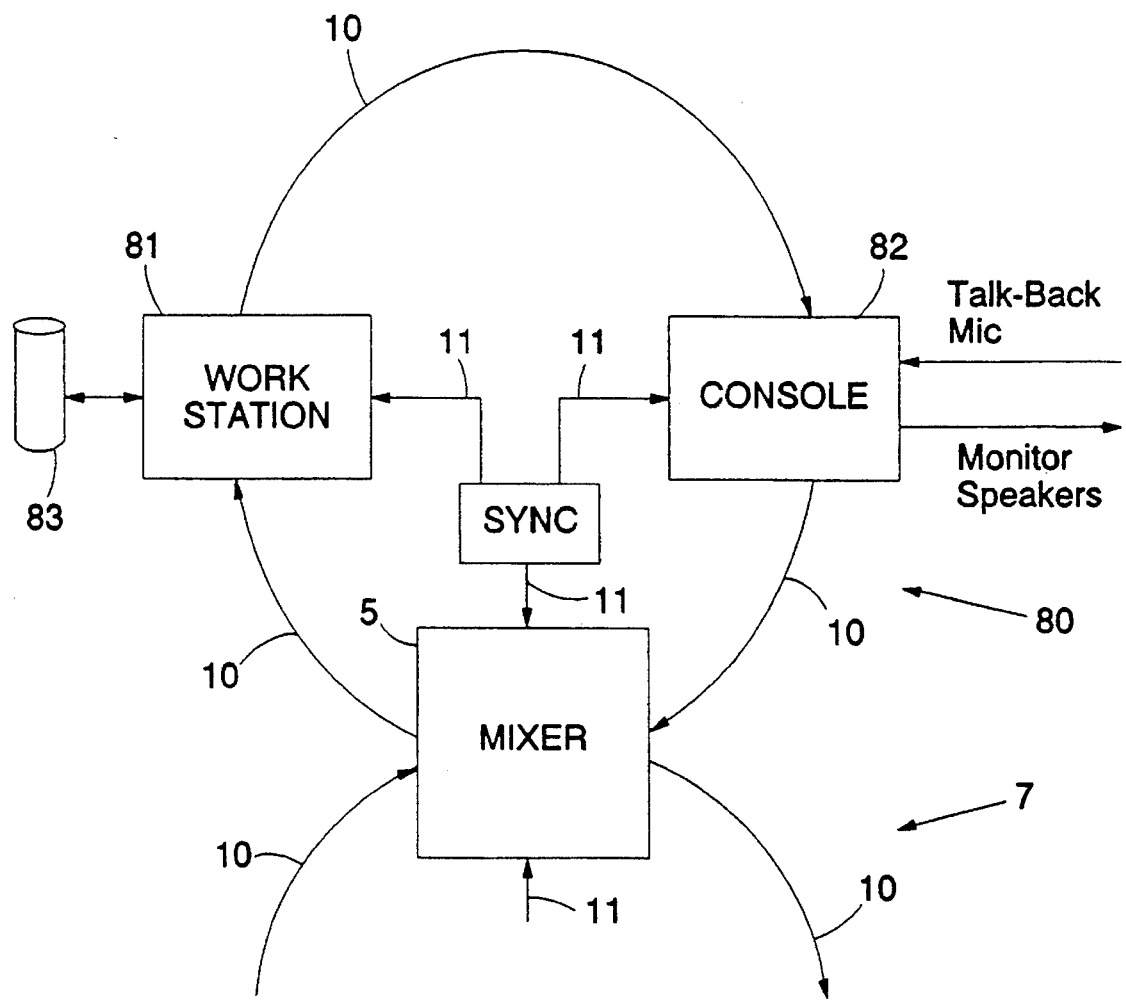
FIG. 18 shows the master device connected in a further, process control ring network with the operator console and a work station.

FIG. 18 shows the mixer 5 connected by links 10 in a main ring network, generally indicated at 7, only part of which is shown in the figure. The main ring network 7 connects the mixer 5 with a plurality of slave devices, for example as shown in FIG. 2 or FIG. 3, and the operation of the main network 7, and the mixer 5 in this network, is as previously described with reference to the examples of FIGS. 2 and 3. However, the mixer 5 is also connected in a further, process control ring network, generally indicated at 80, with a work station 81 and a control console 82. The work station 81 controls the storage and reproduction of automation data by a hard disc drive 83. The mixer 5, work station 81 and console 82 are each connected to the adjacent device in the process control network 80 by a single serial data communication link 10 which, as in the main network 7, is preferably an optical fibre cable. Also as in the main ring network 7, a master synchronising signal (SYNC) is distributed to each device in the process control network 80 by means of SYNC connections 11 as indicated schematically in the figure. The SYNC signal is identical to, and synchronised with, the SYNC signal supplied to devices in the main ring network 7.

The operation of the interface with the incoming and outgoing links 10 in the devices 5, 81, 82 in the process control ring network 80, and the communication of process control data on the network, is in many respects the same as in the main ring network 7. In particular, each device 5, 81 and 82 in the process control network 80 is arranged for transmission and reception of process control data in a manner corresponding to the MADI standard which is used for communication of digital audio data in the main ring network 7 as previously described. The process control data is formatted in frames corresponding to the frames of the MADI format and containing 56 data blocks or channels, one frame being transmitted in each period of the SYNC signal. However, whereas on the main ring network 7 the channels of the MADI frames contain audio sample data, on the process control network 80 channels of the frames contain process control data. The frames are encoded prior to transmission on the process control network 80 in exactly the same way as the MADI frames on the main ring network 7 using the 4-5 bit NRZ encoding scheme, the NRZ code bits being transmitted using an NRZI polarity-free encoding as previously described. Thus, the data symbols defined in ANSI X3T9.5/88-148 referred to earlier are used for encoding the frames for transmission on the process control network 80. The command symbols previously described with reference to FIG. 6 are also used in the process control network 80 in a similar way. In particular, command number 0 performs the synchronisation function specified by the MADI standard for frames transmitted on the process control network 80. Command number 4, which services as the sample address load SAL signal in the main ring network 7 will not be required in the process control network 80, but commands numbers 8 to F are used in a similar way on the process control network for encoding HDLC format set-up data. The set-up data is communicated on the process control network 80 for the purpose of establishing an appropriate allocation of sequences of channels within frames transmitted on this network to the different types of process control data. This process is similar to the allocation of sequences of channels within MADI frames transmitted around the main ring network 7 as described earlier. The set-up procedure will now be described in more detail.

As indicated above, the process control data to be communicated on the process control ring network 80 comprises: process control commands transmitted by the console 82 to the mixer 5 for controlling operation of the mixer 5 in the main ring network 7; process control responses transmitted by the mixer 5 to the console 82 indicating the status of devices in the main ring network for display to the operator; and automation data reproduced by the work station 81 and transmitted to the mixer 5, and console 82. The reproduced automation data comprises process control commands and responses from a previous processing operation performed by the mixer 5 in the main ring network 7, and is transmitted to the mixer and console to enable the previous processing operation to be reproduced for the purposes of monitoring and editing as described above. The sequence of channels within frames circulating round the process control network 80 must be allocated to each type of process control data so that each device 5, 81, 82 can "extract" the appropriate data from frames received from the network, and "add" data to frames transmitted on round the network in the appropriate sequences of channels for extraction by another device in the network. The channel allocation for the process control network is determined by the mixer 5 at set-up by communication of set-up data. Thus, prior to communication of process control data on the network 80, the mixer 5 transmits set-up commands to the work station 81 and console 82 in response to which the work station and console transmit back to the mixer set-up responses whereby the mixer 5 determines the arrangement of the console and work station around the process control network 80 and the numbers of channels within frames to be transmitted round the network which are required by the console and work station for transmission of the process control commands and automation data respectively. The set-up commands and responses are communicated in exactly the same way as previously described for the main ring network 7 except that, in the main ring network 7, the CPU 22 of each device is programmed to respond to a set-up command by indicating the number of data channels associated with that device. In the process control ring network 80, the CPUs (FIG. 21) in the work station 81 and console 82 are programmed to respond with the number of channels which will be needed for supply of data thereby to the network 80. From the set-up responses received on the process control network 80 by the mixer 5, the mixer 5 determines the arrangement of the work station and console around the network and, in dependence upon the arrangement and numbers of channels required by each device, allocates respective sequences of channels within the frame format to process control commands, process control responses and automation data. The channel allocation is communicated by the mixer 5 to the work station 81 and console 82 by means of a further set-up command.

In subsequent operation of the network 80, the devices 5, 81, 82 "read" the appropriate sequences of channels in frames received from the network, and supply data to the network in the appropriate sequences of channels. An example of a suitable channel allocation system for the process control network 80 of FIG. 18 will now be described with reference to FIG. 19.

Figure 19:
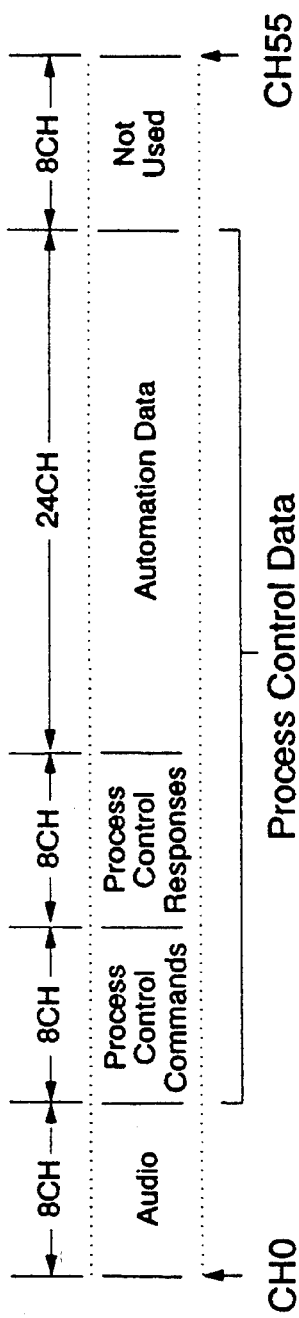
FIG. 19 shows an example of the channel allocation for data on the process control network of FIG. 18.

FIG. 19 shows schematically the format of a frame of data on the process control network 80. The frame consists of 56 channels in accordance with the MADI format, with channel 0 (CH0) on the left hand side of the frame and channel 55 (CH55) on the right hand side of the frame. The allocation of channels to process control data following the set-up procedure is shown, with eight channels (CH), starting at channel 8, being allocated to process control commands, the next eight channels being allocated to process control responses, and the next 24 channels being allocated to automation data. A total of 40 channels within the frame is therefore allocated to process control data leaving 16 channels which can be used for other purposes. In particular, because the communication format corresponds to the MADI format, the spare channels can conveniently be used for audio data communication on the process control network. This is particularly convenient as it is allows for audio data communication between the main ring network, via the mixer 5, and the operator's talk-back microphone and monitor speakers via audio data channels associated with the console 82 as indicated in FIG. 18. Thus, the first eight channels of the frame format, starting with channel 0 (CH0), are allocate during set-up to audio data to be supplied to and from the console. The last eight channels in the frame are not used in this example.

The flow of data around the process control network 80 in operation is generally the same as the data flow system previously described for the main ring network 7 with reference to FIGS. 4b and 5b, with the devices 5, 81 and 82 in the network adding and extracting data from the appropriate sequences of channels as a given frame circulates round the network. However, process control data extracted from an incoming frame by a given device may be read and then transmitted on round the network 80 in the outgoing frame as will be discussed further below with reference to FIG. 21. The main point, however, is that frames are transmitted round the process control network 80 in accordance with the MADI standard, with some of the channels in each frame being occupied by process control data as opposed to audio data.

Figure 20:
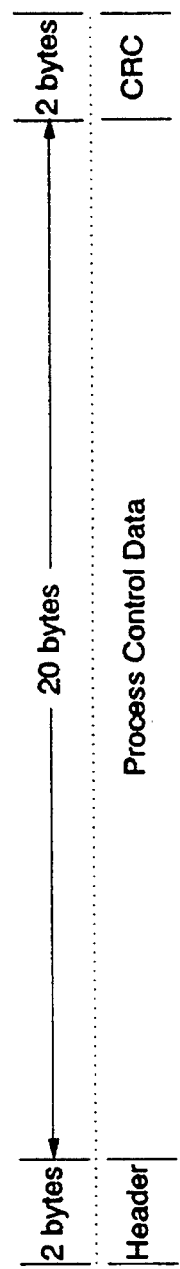
FIG. 20 shows schematically a packet format for process control data.

The process control data occupying the allocated sequences of channels within a frame may be arranged in packets as illustrated in FIG. 20. The process control data packet shown schematically in FIG. 20 consists of a total of 24 bytes, each byte consisting of eight bits. The first two bytes form a header to the process control data which occupies the next 20 bytes of the packet. The last two bytes of the packet are occupied by CRC (cyclic redundancy check) data enabling errors in a transmitted packet to be detected by devices. Since, according to the MADI standard, an unencoded channel consists of 32 bits, 24 of which correspond to audio data, each channel of the frame format shown in FIG. 19 can carry 24 bits, ie three bytes, of a process control data packet shown in FIG. 20. Thus, the complete process control data packet will occupy eight channels of the frame format of FIG. 19. In the example of FIG. 19, each frame carries up to five packets of process control data, process control commands and responses occupying one packet each and automation data occupying three packets. The way in which the process control data is handled by the mixer 5, work station 81 and console 82, and the operation of these devices in the process control data network 80, will now be described with reference to FIGS. 21a to 21c.

Figure 21A:
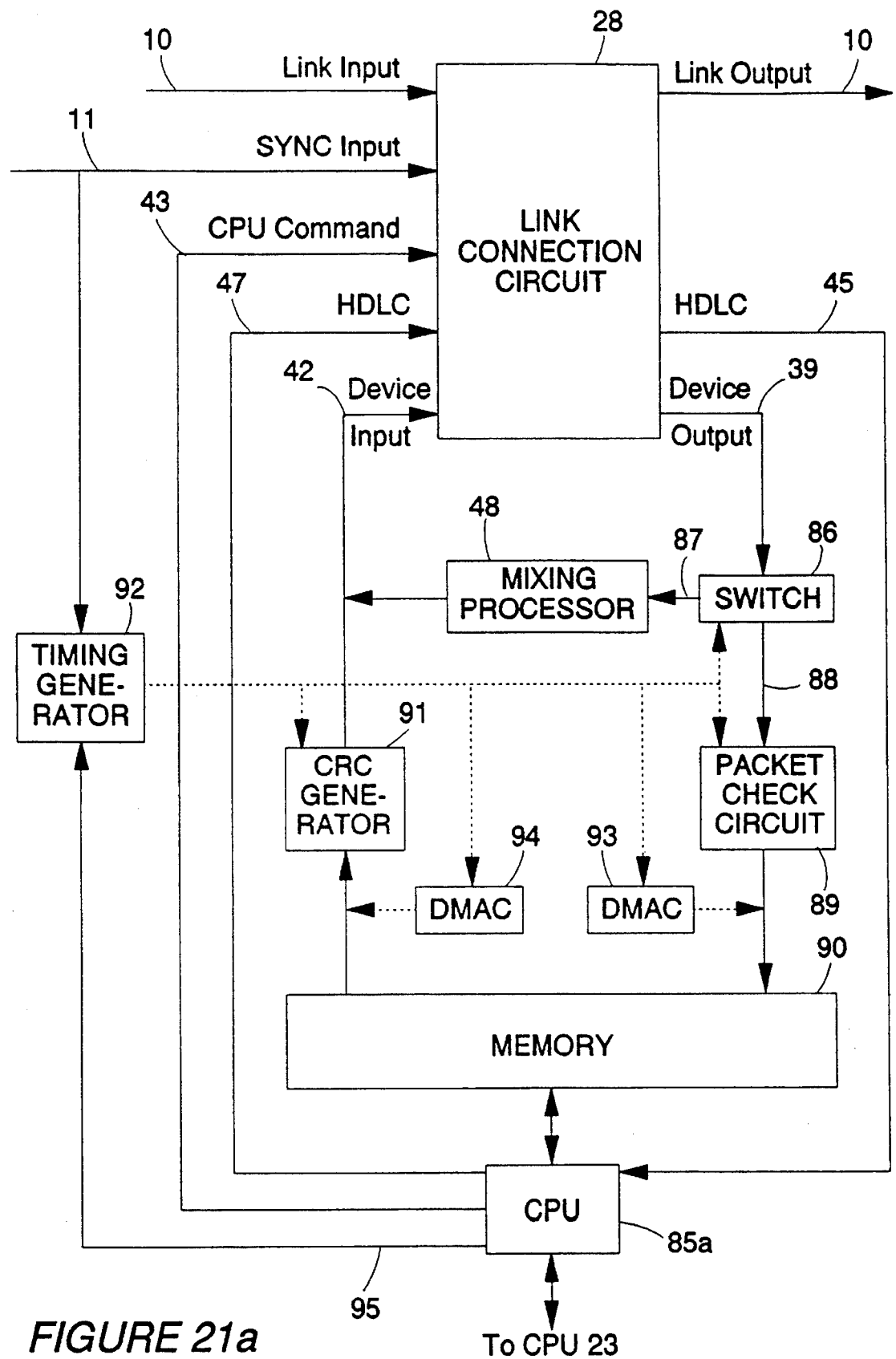
FIGS. 21*a*, 21*b* and 21*c* show how the link connection circuits are connected in the master device, work station and console respectively in the process control network of FIG. 18.
Figure 21B:
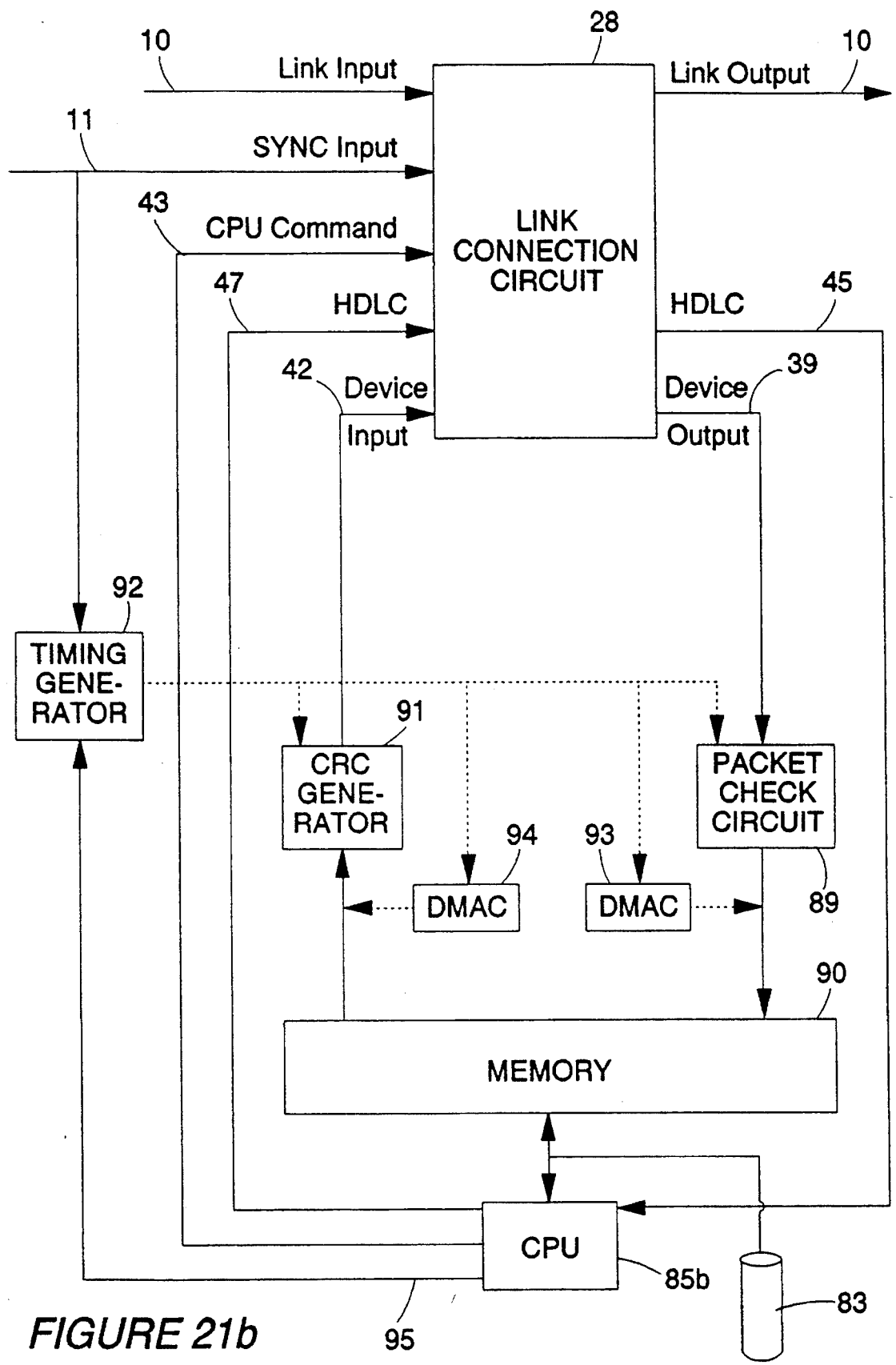
Figure 21C:
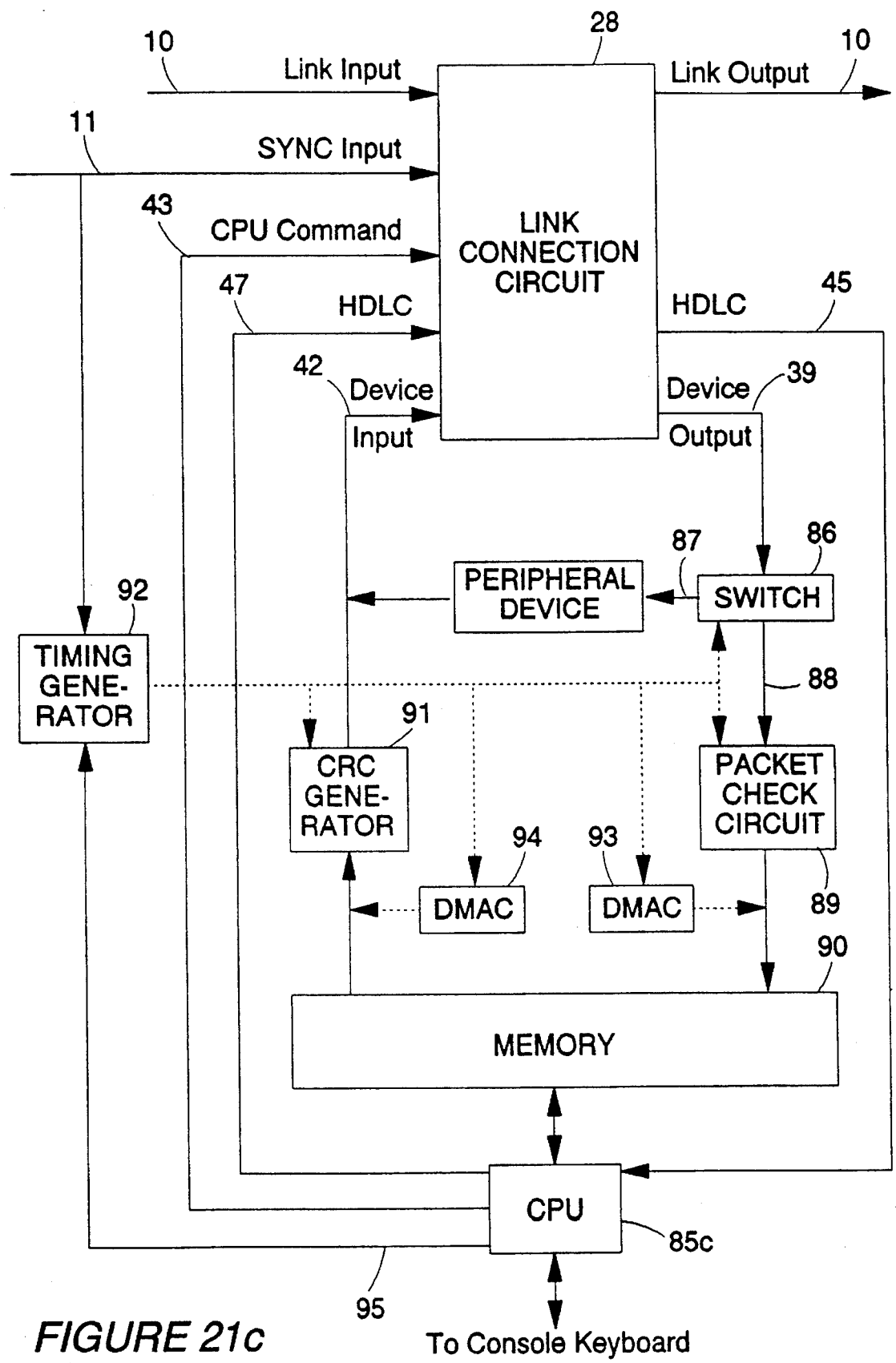

The interface between each of the mixer 5, work station 81 and console 82 and the incoming and outgoings links 10 of the process control network 80 is provided by the basic link connection circuit 28 as used in the main ring network 7 and previously described with reference to FIG. 9. FIGS. 21a, 21b and 21c illustrate schematically how the basic link connection circuit 28 is connected in the mixer 5, work station 81 and console 82 respectively for operation in the network 80. Referring first to FIG. 21a which shows the connection in the mixer, only the operative inputs and outputs of the link connection circuit 28 are shown. Thus, the SAL inputs and outputs of the link connection circuit 28 are omitted since these are not required for operation of the process control network 80. The HDLC output 45 of the circuit 28 is connected to a further CPU 85a in the mixer 5 for communication of set-up data from the network 80 to the CPU 85a. Similarly, the CPU 85a is connected to the HDLC input 47 of the circuit 28 for supply of set-up data to the network 80. The device output 39 of the circuit 28 forms the input to a switch 86 having one output 87 connected to the mixing processor 48 of the mixer 5 and a second output 88 which forms the input to a packet check circuit 89 for checking process control data packets as will be described further below. An output of the packet check circuit 89 forms an input to a memory 90 which is connected for two-way communication of data with the CPU 85a. (In fact, the memory 90 may be provided by the CPU 85a if sufficient memory capacity is available.) The memory 90 also has an output connected to a CRC generator 91 which in turn is connected to the device input 42 of the link connection circuit 28. The mixing processor 48 also has an output connected to the device input 42. As in the interface with the main ring network 7, the CPU 85a is connected to the CPU command input 43 of the circuit 28 for controlling operation of the timing generator 34 (FIG. 9) in the circuit 28. In this case, however, a further timing generator 92 is needed to provide timing control (indicated by broken lines in FIG. 21a) to the switch 86, CRC generator 91, packet check circuit 89 and two direct memory access control units (DMACs) 93 and 94 which control the input and output respectively of data to and from the CPU memory 90. The timing generator 92 also receives the master synchronising signal from the SYNC input 11 of the link connection circuit 28 and operates under the control of the CPU 85a via a further output 95 of the CPU.

As indicated in the figure, the CPU 85a which controls the interface with the process control network 80 in the mixer 5 is connected to the CPU 23 (FIG. 10) which controls the interface between the mixer 5 and the main ring network 7. Alternatively, however, if sufficient processing capacity is available, a single CPU may be provided in the mixer 5 for performing the functions of both CPUs 23, 85 and thus controlling both interface circuits in the mixer.

The link connection circuits 28 in the work station 81 and console 82 are connected in a similar manner to the CPUs 85b and 85c respectively of these devices as illustrated in FIGS. 21b and 21c in which parts corresponding to those of FIG. 21a are indicated by like reference numerals. In the case of the work station as shown in FIG. 21b, however, the switch 86 is omitted and the device output 39 of the link connection circuit 28 is connected directly to the input of the packet check circuit 89. In addition, the CPU 85b is connected to the hard disc drive 83 of the work station in which the automation data is stored.

In the case of the console 82, the output 87 of the switch 86 is shown connected to the peripheral device connected to the console. In the case of data supplied to the peripheral device by the switch 86, the peripheral device as shown represents the monitor speakers. In the case of data supplied by the peripheral device to the device input 42 of the circuit 28, the peripheral device as shown represents the operator's talk-back microphone. The CPU 85c of the console 82 is connected to the console keyboard controlled by the operator.

The operation of the process control ring network during a playback session, during which a processing operation previously performed by the mixer in the main ring network 7 is reproduced for the purposes of editing, will now be described in detail with reference to FIGS. 21a to 21c.

On initial set-up of the process control ring network, the mixer 5 must first determine an appropriate channel allocation system for the network. This process can be triggered in any convenient way, for example automatically by the CPU 85a in the mixer or by operation of a control switch on the mixer. The CPU 85a then generates a set-up command signal for transmission around the ring network 80, and the work station 81 and console 82 will respond indicating the number of channels required for transmission of data thereby on the network 80. From the set-up responses received from the work station and console, the mixer 5 allocates respective sequences of channels within the frame format to audio data, process control commands, process control responses and automation data, and communicates the allocation to the work station and console. This communication of set-up data is achieved in the same way as in the main ring network and previously described with reference to FIGS. 9 to 12. Thus, the set-up data is communicated between the CPUs 85a, 85b and 85c via the HDLC inputs and outputs 47, 45 of the link connection circuits 28, the HDLC data being encoded as command symbols in accordance with the table of FIG. 6 by the transmitters 31 (FIG. 9) in the link connection circuits 38 for transmission over the outgoing links 10, and decoded accordingly by the receivers 30 (FIG. 9) on receipt from the incoming links 10.

As in the case of the main ring network 7, in addition to informing the work station 81 and console 82 of the channel allocations for the respective types of data, during the set-up procedure, the mixer 5 also communicates to the work station and console, via the HDLC connections, the position of each device around the network 80. This information is used by the CPU 85b, 85c of each device to control the timing generator 34 (FIG. 9) in the link connection circuit 28 to effect the appropriate transmission delay for that device in accordance with the system of FIG. 5b.

After communication of the set-up data, communication of audio and process control data can commence on the process control network 80. In the following description, it will be assumed that the channel allocation established by the set-up procedure is as shown in the example of FIG. 19.

Considering first a frame transmitted over the link 10 between the work station 81 and console 82, this frame will consist of an initial eight channels, at least some of which are occupied by audio data originally transmitted by the mixer 5 for output by the console 82 to its monitor speakers. The next sequence of eight channels in the frame, which is allocated to process control commands, will be empty because the content of this sequence of channels has been extracted at an earlier stage in the network. The next sequence of eight channels in the frame is occupied by a process control response data packet originally transmitted by the mixer 5 and indicating status of devices in the main ring network 7 to be displayed to the operator via the console 82. The following sequence of 24 channels in the frame is occupied by automation data reproduced by the work station 81 from its hard disc 83. The automation data consists of up to three packets of process control data as shown in FIG. 20 and formatted as channel data as previously described. Each of these control data packets carries either process control commands or process control responses, corresponding to a previous processing operation performed by the mixer 5 in the main ring network 7, for controlling operation of the mixer and console to reproduce the previous processing operation. The last eight channels of the frame are unused as indicated in FIG. 19.

On receipt of the frame by the console 82, the channels to be "extracted" by the console are thus the first eight channels of audio data, the second eight channels of process control commands, and the 24 channels of automation data. On receipt by the receiver 30 (FIG. 9) in the link connection circuit 28 of the console 82, the receiver 30 is triggered by the timing generator 34 in response to the SYNC input 11 to decode the received frame into the internal data format. The complete frame of decoded data is supplied to the data output of the receiver 30, as opposed to the command output, in the same way as a frame of audio data on the main ring network 7. The frame of data decoded by the receiver 30 is thus supplied to the multiplexer 37 and output format converter 33 in the link connection circuit 28 of the console.

The CPU 85c in the console controls the timing generator 34 to activate the output format converter 33 to "extract" from the frame supplied thereto the data occupying the relevant sequences of channels, ie channels 0 to 7 and 16 to 47, for supply to the device output 39 of the link connection circuit 28. As previously described with reference to FIG. 5b, the particular data extracted at this time will not in fact be supplied to the device output 39 until the next but one SYNC signal. Accordingly, corresponding data from the last but one frame received by the console is supplied by the output format converter to the device output 39. This data is supplied to the input of the switch 86 which, under control of the timing generator 92, supplies input data either to its output 87 or its output 88. The timing generator 92 operates under control of the CPU 85c via the CPU output 95 to control the switch 86 such that any data occupying the first eight channels of the frame, ie audio data, is supplied to the peripheral device of the console, in this case the monitor speakers. Under control of the timing generator 92, the switch 86 then supplies data which occupied channels 16 to 47 to its output 88. This data comprises one control data packet containing process control responses and up to three data packets of automation data. Again under control of the timing generator 92, the packet check circuit 89 checks each received packet for valid data (ie that the packet is not an "empty" packet) by analysing the packet header, and then checks the CRC data for each packet. If the data is error-free, the data is loaded to the memory 90 by the DMAC 93 under control of the timing generator 92 and read by the CPU 85c.

In response to the process control response data (originally transmitted by the mixer 5 and indicating the status of devices in the main ring network) the CPU 85c controls the console keyboard to display the appropriate information to the operator. In response to the automation data, the CPU 85c detects from the headers of the data packets which of the packets contains process control responses and, assuming no conflict between these and the "new" process control responses received from the mixer 5, controls the console keyboard accordingly to present the relevant display to the operator. Where the automation data conflicts with "new" process control responses as a result of editing, the "old" process control responses of the automation data are ignored.

The generation of the outgoing frame by the console 82 is as follows. Audio data input from the console's peripheral device, ie the talk-back microphone, is supplied by the peripheral device to the device input 42 of the link connection circuit 28. If the operator monitoring the playback operation alters any keyboard controls to edit, ie change, the operation in some way, then the CPU 85c in the console generates a new process control command for transmission to the mixer 5. The new command is supplied via the memory 90 to the CRC generator 91 which generates appropriate CRC data for the new process control data packet. Data is loaded to the CRC generator 91 by the DMAC 94 which, along with the CRC generator 91, operates under timing control by the timing generator 92 which is in turn controlled by the CPU 85c. The automation data corresponding to all three received packets is then also supplied from the memory 90 to the CRC generator 91 under control of the CPU 85c, the CPU 85c setting a flag in the header of any process control response packets which have been read and acted upon by the CPU.

The data supplied to the device input 42 of the link connection circuit 28 thus consists of audio data from the peripheral talkback microphone followed by four control data packets, one of process control commands and three of automation data. Under control of the timing generator 34 in the link connection circuit, the input format converter 32 (FIG. 9) converts this data into the unencoded channel format of the MADI standard and supplies the data to the multiplexer 37 at appropriate timings corresponding to the positions of the respective channel sequences as shown in FIG. 19. In the case of the console, no data from the original frame received and decoded by the receiver 30 is to be transmitted directly onward in the outgoing frame, so that the output of the multiplexer 37 is connected to the input format converter for the duration of the received frame. The output of the multiplexer 37 is supplied to the data input of the transmitter 31 which encodes the data into the transmission format and, under control of the timing generator 34, transmits the new frame over the outgoing link 10. In accordance with the system previously described with reference to FIG. 5b, transmission of the new frame commences one microsecond after transmission of the incoming frame commenced.

The frame transmitted by the console 82 to the mixer 5 thus consists of an initial eight channels, one or more of which is occupied by audio data from the console's peripheral devices to be transmitted to the main ring network 7 by the mixer 5. In this example, the audio data is solely that from the operator's talk-back microphone. The next sequence of eight channels is allocated to process control commands and will be occupied by a process control data packet if a new command has been entered at the console by the operator. The following eight channels, allocated to process control responses, will be empty, and channels 24 to 47 are occupied by the three packets of automation data originally transmitted by the work station 81 and "passed on" after having been read by the console CPU.

A similar process is performed in the mixer 5 on receipt of the frame from the console 82. Here, however, the mixer 5 reads channels 0 to 15 and 24 to 47 of the received frame. Thus, the data occupying channels 0 to 15 and 24 to 47 are supplied by the output format converter 33 in the link connection circuit 28 of the mixer to the device output 39 shown in FIG. 21a. The subsequent circuitry in the mixer 5 operates in the same way as the corresponding circuitry in the console 82 previously described. Thus, the audio data is supplied by the switch 86 to the mixing processor 48 in the mixer from where the data is supplied to the main ring network 7 via the link connection circuit with that network as previously described with reference to FIG. 10. Similarly, audio data from the main ring network 7 to be supplied to the monitor speakers of the console 82 will be supplied by the mixing processor 48 to the device input 42 in the circuit of FIG. 21a. The process control data packets are supplied to the memory 90 and read by the CPU 85a of the mixer. Process control commands from the console will be communicated by the CPU 85a to the CPU 23 of FIG. 10 for controlling operation of devices in the main ring network as previously described for that network. Similarly, the CPU 85a will convey any "old" process control commands contained in the automation data packets to the CPU 23, with the exception of any commands which conflict with "new" commands supplied directly from the console for editing the processing operation.

The new frame to be transmitted onto the work station 81 by the mixer 5 is constructed in a similar fashion as in the console 82. Thus, the audio data to be transmitted onto the console 82 will be supplied to the device input 42 of the link connection circuit 28 followed by the process control data packets to be transmitted on round the network. Since the automation file stored in the hard disc 83 of the work station 81 is to be updated with the "new" process control commands transmitted by the console 82 during the editing session, new process control commands received and acted upon by the mixer 5 are transmitted on to the work station 81. Thus, following the audio data, the process control command data packet will be supplied to the device input 42 of the link connection circuit, followed by a process control response data packet containing device status responses from the main ring network 7 communicated via the CPU 23 to the CPU 85a in the mixer. The three packets of automation data received by the mixer 5 are also passed on to the device input 42, the CPU 85a here setting a flag in the header of any process control command packets of the automation data which have been read and acted upon by the CPU 85a.

In the same way as in the console 82, the link connection circuit constructs and transmits the new frame on the outgoing link 10 from the mixer 5, with the data occupying the appropriate sequences of channels in accordance with FIG. 19. In accordance with the system of FIG. 5b, the outgoing frame is transmitted by the mixer 5 on the next SYNC pulse following transmission of the last outgoing frame by the mixer 5.

The frame transmitted to the work station 81 therefore consists of an initial eight channels occupied by audio data to be transmitted to the peripheral monitor speakers of the console 82, followed by eight channels occupied by a process control command data packet acted upon by the mixer 5. The next eight channels are occupied by a process control response data packet to be communicated to the console 82, and the following 24 channels by the three packets of automation data originally transmitted by the work station 81 and now acted upon by both the console 82 and mixer 5. On receipt of the frame by the work station 81, the operation is similar to that in the mixer and console previously described. In this case, however, the work station does not need to read all occupied channels of the received frame, and in particular the initial eight channels which contain audio data to be transmitted on to the console. The CPU 85b in the work station controls the timing generator 34 (FIG. 9) to control the output format converter 33 to "extract" process control data only from the relevant channels for supply to the device output 39 of the link connection circuit 28. The process control data packets are supplied directly to the memory 90 via the packet check circuit 89 and read by the CPU 85b. The respective data packets occupied by "new" process control commands and responses are stored by the hard disc drive 83 connected to the CPU bus to update the automation file in accordance with the changes made by the operator during the editing session. The CPU 85*b* checks that the flags added to the three packets of automation data indicate that the data has been successfully read by the mixer and console and can thus be overwritten. The CPU 85*b* can then access the automation file on the hard disc drive 83 to produce the next three automation data packets corresponding to the next portion of the previous processing operation. The data supplied to the device input 42 of the link connection circuit 28 in the work station thus consists of the process control response data packet to be transmitted on to the console 82, and the three new packets of automation data to be transmitted onto the console 82 and mixer 5. The process control command data packet received by the work station can be deleted after the automation file on the hard disc drive 83 has been updated.

In the link connection circuit 28, the timing generator 34 controls the multiplexer 37 to supply the initial eight channels of audio data from the frame received from the network to the output of the multiplexer, and thereafter the process control response and automation data packets supplied thereto at appropriate timings by the input format converter 32. The resulting frame is then encoded by the transmitter 31 in the usual way and transmitted on round the outgoing link to the console 82, transmission of the new frame commencing one microsecond after transmission of the original frame by the mixer 5 commenced in accordance with the system of FIG. 5*b*.

The above process is then repeated for the new frame supplied to the console 82, the operation of the network continuing for the duration of the playback session.

The process control communication is thus achieved on the network 80 in substantially the same manner as audio communication on the main ring network 7, allowing the same link connection circuit 28 to be used as the interface circuit with relatively little additional circuitry required to handle the process control data packets. This additional circuitry could of course be implemented in software if the CPUs 85*a*, 85*b* and 85*c* have sufficient processing capability.

At the end of the playback session, the automation data file stored by the hard disc drive 83 defines the processing operation performed on the main network 7 during the playback session, and can be reproduced for further editing of the session as required.

It will of course be appreciated that a further device or devices could be connected in the process control ring network to make use of the "spare" channels in the frame format, ie the last eight channels in the example of FIG. 19. Further, the same interface and communication format could be used to connect the mixer 5 to a further processor, such as a disc recorder, where some of the channels of the frame format are needed to provide the required control data transfer, the remaining channels being used for audio data transfer.

A further advantage of the process control network 80 is that, following a processing session, the automation file can be transferred, via the mixer 5, for direct recording on a multi-track tape recorder connected to the mixer 5, for example in the main ring network 7. This allows the automation file to be recorded at the end of a master tape on which the audio session is recorded.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Data communications apparatus comprising:

a master device for processing digital audio data; and a plurality of slave devices connected in a ring network with the master device, each slave device having a plurality of data channels associated therewith and being arranged to supply audio data from the ring network to the data channels associated with the slave device and/or to supply audio data to the ring network from the data channels associated with the slave device;

wherein the master and slave devices are arranged for serial communication via the ring network of frames of digital audio data, each frame comprising a plurality of data blocks which contain audio sample data corresponding to respective audio signals; and wherein the master and slave devices are further arranged for communication via the ring network of set-up data comprising set-up commands transmitted by the master device to the slave devices and set-up responses transmitted by the slave devices to the master device, whereby the master device determines the arrangement of slave devices around the ring network and the number of data channels associated with each slave device, and, in dependence upon the arrangement and the number of data channels, allocates to a slave device, which is arranged to supply audio data from the network to the data channels associated with the slave device, a sequence of data blocks within each frame of the digital audio data format in which audio data will be transmitted to that slave device.

2. Apparatus as claimed in claim 1, wherein the ring network is formed by connecting each of the master and slave devices in series by means of a serial data communication link, and wherein each of the devices is arranged for communication of both the digital audio data and the set-up data via the serial data communication links.

3. Apparatus as claimed in claim 2, wherein each of the devices is arranged for transmission of data over the serial data communication links at a transmission rate which is greater than the maximum used digital audio data transmission rate.

4. Apparatus as claimed in claim 3, wherein each of the master and slave devices is further arranged for communication via the serial data communication links of control data, comprising control commands transmitted by the master device to the slave devices and control responses transmitted by the slave devices to the master device, whereby the master device can control the operation of each slave device during the communication of digital audio data on the ring network.

5. Apparatus as claimed in claim 4, wherein at least one of the slave devices is connected to at least one peripheral device to supply audio data from the ring network to the peripheral device, and/or to supply audio data to the ring network from the peripheral device, via the data channels associated with that slave device, the slave device being arranged for controlling operation of the peripheral device in response to said control data transmitted by the master device.

6. Apparatus as claimed in claim 4, wherein at least one of the slave devices comprises, or is connected to, a tape recording device, and wherein the control data includes time codes from the tape recording device transmitted by that slave device to the master device.

7. Apparatus as claimed in claim 6, wherein the master device includes a master counter, and the slave device includes:

a slave counter synchronisable with the master counter;

means for setting the count of the slave counter to that of the master counter;

means for sampling the count of the slave counter on receipt of a time code from the tape recording device; and means for transmitting both the time code and the sampled count of the slave counter to the master device as control data;

whereby the master device can determine from said control data and the count of the master counter on receipt of the control data the correct value for the time code at the time of receipt of the control data.

8. Apparatus as claimed in claim 4, wherein the control data is communicated using the HDLC protocol.

9. Apparatus as claimed in claim 8, wherein each of the master and slave devices includes:

means for encoding the digital audio data to be transmitted by that device in accordance with a 4–5 bit encoding scheme whereby successive 4-bit bytes of the digital audio data are encoded into 5-bit data symbols each of which corresponds to a respective 4-bit data pattern, and means for encoding the HDLC data to be transmitted by that device such that successive n-bit bytes of the HDLC data are encoded using 5-bit symbols other than said data symbols.

10. Apparatus as claimed in claim 9, wherein successive 3-bit bytes of the HDLC data are encoded into pairs of 5-bit symbols other than said data symbols, each pair of 5-bit symbols corresponding to a respective 3-bit data pattern.

11. Apparatus as claimed in claim 1, wherein the set-up data is communicated using the HDLC protocol.

12. Apparatus as claimed in claim 11, wherein each of the master and slave devices includes:

means for encoding the digital audio data to be transmitted by that device in accordance with a 4–5 bit encoding scheme whereby successive 4-bit bytes of the digital audio data are encoded into 5-bit data symbols each of which corresponds to a respective 4-bit data pattern, and means for encoding the HDLC data to be transmitted by that device such that successive n-bit bytes of the HDLC data are encoded using 5-bit symbols other than said data symbols.

13. Apparatus as claimed in claim 12, wherein successive 3-bit bytes of the HDLC data are encoded into pairs of 5-bit symbols other than said data symbols, each pair of 5-bit symbols corresponding to a respective 3-bit data pattern.

14. Apparatus as claimed in claim 1, wherein each slave device includes means for transmitting digital audio data which is received by the slave device from the ring network, and which occupies data blocks not allocated to that slave device, to the ring network in the same data blocks as occupied by that audio data when received by the slave device.

15. Apparatus as claimed in claim 14, wherein each slave device commences transmission to the ring network of a frame of digital audio data less than one frame period after transmission of the corresponding frame to that slave device by the preceding device in the ring network commenced.

16. Apparatus as claimed in claim 1, wherein the digital audio data is formatted in MADI format.

17. Apparatus as claimed in claim 16, the master device being arranged to adapt its operation for point-to-point MADI communication with a slave device if no set-up response is received by the master device in response to a set-up command transmitted by the master device.

18. Apparatus as claimed in claim 1, wherein the master device is a digital mixer.

19. Data communications apparatus comprising:

a master device for processing digital audio data;

a plurality of slave devices connected in a ring network with the master device, each slave device having a plurality of data channels associated therewith and being arranged to supply audio data from the ring network to the data channels associated with the slave device and/or to supply audio data to the ring network from data channels associated with the slave device;

wherein the master and slave devices are arranged for serial communication via the ring network of frames of digital audio data, each frame comprising a plurality of data blocks which contain audio sample data corresponding to respective audio signals; and wherein the master and slave devices are further arranged for communication via the ring network of set-up data comprising set-up commands transmitted by the master device to the slave devices and set-up responses transmitted by the slave devices to the master device, whereby the master device determines the arrangement of slave devices around the ring network and the number of data channels associated with each slave device, and, in dependence upon the arrangement and the number of data channels, allocates to a slave device, which is arranged to supply audio data from the network to the data channels associated with the slave device, a sequence of data blocks within each frame of the digital audio data format in which audio data will be transmitted to that slave device;

a control console for controlling operation of the master device in the ring network; and a work station for storage and reproduction of automation data defining a processing operation performed by the master device in the ring network;

wherein the master device, console and work station are connected in a process control ring network and arranged for serial communication via the process control ring network of process control data comprising process control commands transmitted by the console to the master device for controlling operation of the master device in the ring network, process control responses transmitted by the master device to the console indicating the status of slave devices in the ring network, and said automation data reproduced by the work station and transmitted by the work station to the master device and console, the reproduced automation data comprising said process control commands and responses transmitted by the console and master device during a previous processing operation performed by the master device in the ring network; and wherein the master device, console and work station are further arranged for communication of said process control data formatted in frames corresponding to the frames of the digital audio data format, the process control commands, process control responses and reproduced automation data occupying respective sequences of data blocks within said frames.

20. Apparatus as claimed in claim 19, wherein each of the master device, console and work station are further arranged for communication via the process control ring network of process control set-up data comprising process control set-up commands transmitted by the master device to the console and work station and process control set-up responses transmitted by the console and work station to the master device, whereby the master device determines the arrangement of the console and work station around the process control ring network and the number of said data blocks within a frame of the process control data format which are required by the console and work station for transmission of the process control commands and automation data respectively, and, in dependence upon the arrangement and the number of data blocks, allocates the data blocks within each frame of the process control data format to process control commands, process control responses and automation data, and communicates the allocation to the console and work station.

21. Apparatus as claimed in claim 19, wherein the console is further arranged for communication of audio data between the process control ring network and a plurality of data channels associated with the console, and wherein the master device and console are further arranged for communication of said audio data between the console and master device via the process control ring network in a further sequence of data blocks within the frames of the process control data format.

22. Apparatus as claimed in claim 21, wherein each of the master device, console and work station are further arranged for communication via the process control ring network of process control set-up data comprising process control set-up commands transmitted by the master device to the console and work station and process control set-up responses transmitted by the console and work station to the master device, whereby the master device determines the arrangement of the console and work station around the process control ring network and the number of said data blocks within a frame of the process control data format which are required by the console and work station for transmission of data thereby, and, in dependence upon the arrangement and the number of data blocks, allocates the data blocks within each frame of the process control data format to process control commands, audio data, process control responses and automation data, and communicates the allocation to the console and work station.

23. Apparatus as claimed in claim 19, wherein the work station is arranged to read the data blocks allocated to process control commands transmitted by the console and process control responses transmitted by the master device in frames received by the work station from the process control ring network, and to update the stored automation data with the commands and responses.

24. A method for communication of digital audio data between a master device, for processing digital audio data, and a plurality of slave devices connected in a ring network with the master device, each slave device having a plurality of data channels associated therewith and being arranged to supply audio data from the ring network to the data channels associated with the slave device and/or to supply audio data to the ring network from the data channels associated with the slave device, which method comprises:

transmitting frames of the digital audio data serially between the master and slave devices, each frame comprising a plurality of data blocks which contain audio sample data corresponding to respective audio signals;

transmitting between the master and slave devices via the ring network set-up data comprising set-up commands transmitted by the master device to the slave devices and set-up responses transmitted by the slave devices to the master device;

determining the arrangement of slave devices around the ring network and the number of data channels associated with each slave device; and, in dependence upon the arrangement and the number of data channels, allocating to a slave device, which is arranged to supply audio data from the network to the data channels associated with the slave device, a sequence of data blocks within each frame of the digital audio data format in which audio data will be transmitted to that slave device; and transmitting serially on a process control ring network, in which a master device is connected with a control console, for controlling operation of the master device in the ring network, and a work station, for storage and reproduction of automation data defining a processing operation performed by the master device in the ring network, process control data comprising process control commands transmitted by the console to the master device for controlling operation of the master device in the ring network, process control responses transmitted by the master device to the console indicating the status of slave devices in the ring network, and said automation data reproduced by the work station and transmitted by the work station to the master device and console, the reproduced automation data comprising said process control commands and responses transmitted by the console and master device during a previous processing operation performed by the master device in the ring network;

wherein the process control data communicated via the process control ring network is formatted in frames corresponding to the frames of the digital audio data format, and the process control commands, process control responses and reproduced automation data occupy respective sequences of data blocks within said frames.

25. A method as claimed in claim 24, further including:

updating the automation data stored by the work station with the process control commands and responses transmitted by the console and master device respectively during a processing operation, and, after the processing operation, transmitting the updated automation data from the work station to the mixer via the process control ring network for recording by a multi-track tape recording device connected to the mixer.

26. A method for communication of digital audio data between a master device, for processing digital audio data, and a plurality of slave devices connected in a ring network with the master device, each slave device having a plurality of data channels associated therewith and being arranged to supply audio data from the ring network to the data channels associated with the slave device and/or to supply audio data to the ring network from the data channels associated with the slave device, which method comprises:

transmitting frames of the digital audio data serially between the master and slave devices, each frame comprising a plurality of data blocks which contain audio sample data corresponding to respective audio signals;

transmitting between the master and slave devices via the ring network set-up data comprising set-up commands transmitted by the master device to the slave devices and set-up responses transmitted by the slave devices to the master device;

determining the arrangement of slave devices around the ring network and the number of data channels associated with each slave device; and, in dependence upon the arrangement and the number of data channels, allocating to a slave device, which is arranged to supply audio data from the network to the data channels associated with the slave device, a sequence of data blocks within each frame of the digital audio data format in which audio data will be transmitted to that slave device.

* * * * *